United States Patent
Nakaguchi et al.

(10) Patent No.: US 11,799,402 B2
(45) Date of Patent: Oct. 24, 2023

(54) DRIVE DEVICE, SHORT CIRCUIT DETECTION METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shinnosuke Nakaguchi, Yokkaichi (JP); Kota Oda, Yokkaichi (JP); Shunichi Sawano, Yokkaichi (JP); Masayuki Kato, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/755,522

(22) PCT Filed: Oct. 13, 2020

(86) PCT No.: PCT/JP2020/038613
§ 371 (c)(1),
(2) Date: Apr. 29, 2022

(87) PCT Pub. No.: WO2021/085118
PCT Pub. Date: May 6, 2021

(65) Prior Publication Data
US 2022/0376637 A1 Nov. 24, 2022

(30) Foreign Application Priority Data

Nov. 1, 2019 (JP) .................................. 2019-200125

(51) Int. Cl.
*H02H 7/20* (2006.01)
*H02P 7/29* (2016.01)
(Continued)

(52) U.S. Cl.
CPC ................. *H02P 5/68* (2013.01); *H02H 7/20* (2013.01); *H02P 7/29* (2013.01); *H02P 27/06* (2013.01)

(58) Field of Classification Search
CPC ...... H02P 1/18; H02P 1/00; H02P 1/42; H02P 1/46; H02P 1/54; H02P 3/12; H02P 3/22;
(Continued)

(56) References Cited

U.S. PATENT DOCUMENTS

| 2004/0245954 | A1 | 12/2004 | Moench et al. | |
| 2009/0026993 | A1* | 1/2009 | Nishibe | H02P 7/04 318/283 |
| 2018/0175770 | A1 | 6/2018 | Hellstrom | |

FOREIGN PATENT DOCUMENTS

| CN | 102801353 A | 11/2012 |
| JP | H10-014285 A | 1/1998 |

(Continued)

OTHER PUBLICATIONS

International Search Report, Application No. PCT/JP2020/038613, dated Jan. 12, 2021. ISA/Japan Patent Office.

*Primary Examiner* — Antony M Paul
(74) *Attorney, Agent, or Firm* — Honigman LLP

(57) ABSTRACT

In a drive device, a first connection circuit, a second connection circuit, and a third connection circuit are connected individually between an input end and an output end. A first motor is connected between a connection node between a first input switch and a first output switch of the first connection circuit and a connection node between a third intermediate switch and a third output switch of the third (Continued)

connection circuit. A second motor is connected between a connection node between a second input switch and a second output switch of the second connection circuit and a connection node between a third input switch and the third intermediate switch of the third connection circuit.

14 Claims, 16 Drawing Sheets

(51) Int. Cl.
    *H02P 27/06*     (2006.01)
    *H02P 5/68*     (2006.01)

(58) Field of Classification Search
    CPC .... H02P 6/00; H02P 6/005; H02P 6/08; H02P 6/12; H02P 6/30; H02P 6/32; H02P 7/00; H02P 7/04; H02P 7/29; H02P 7/292; H02P 7/295; H02P 8/00; H02P 21/00; H02P 21/22; H02P 23/00; H02P 25/00; H02P 25/032; H02P 25/034; H02P 25/062; H02P 25/064; H02P 27/00; H02P 27/04; H02P 27/06; H02P 27/08; H02P 2207/05; H02P 25/04; H02P 6/28; H02P 6/22; H02P 1/22; H02P 2006/045; H02P 7/28; H02K 11/33; E06B 9/72; E06B 9/70

See application file for complete search history.

(56) References Cited

FOREIGN PATENT DOCUMENTS

| | | |
|---|---|---|
| JP | 2001-061288 A | 3/2001 |
| JP | 2004-064934 A | 2/2004 |
| JP | 2015-051718 A | 3/2015 |
| KR | 0774763 | 11/2007 |

\* cited by examiner

FIG. 3

| First motor | Second motor | First input switch | First output switch | Third input switch | Third intermediate switch | Third output switch | Second input switch | Second output switch |
|---|---|---|---|---|---|---|---|---|
| Forward direction | — | ON | — | — | — | ON | — | — |
| Reverse direction | — | — | ON | ON | ON | — | — | — |
| — | Forward direction | — | — | ON | — | — | — | ON |
| — | Reverse direction | — | — | — | ON | ON | ON | — |
| Forward direction | Forward direction | ON | — | ON | ON | ON | — | ON |
| Forward direction | Reverse direction | ON | — | — | ON | ON | ON | — |
| Reverse direction | Forward direction | — | ON | ON | ON | — | — | ON |
| Reverse direction | Reverse direction | — | ON | — | ON | — | ON | — |

FIG. 4

| First motor | Second motor | PWM switch for first motor | PWM switch for second motor |
|---|---|---|---|
| Forward direction | — | First input switch or third output switch | |
| Reverse direction | — | First output switch, third input switch, or third intermediate switch | |
| — | Forward direction | | Second output switch or third input switch |
| — | Reverse direction | | Second input switch, third intermediate switch, or third output switch |
| Forward direction | Forward direction | First input switch or third output switch | Second output switch or third input switch |
| Forward direction | Reverse direction | First input switch or third output switch | Second input switch, third intermediate switch, or third output switch |
| Reverse direction | Forward direction | First output switch, third input switch, or third intermediate switch | Second output switch or third input switch |
| Reverse direction | Reverse direction | First output switch, second input switch, or third intermediate switch | |

FIG. 6

Short circuit detection processing

| Sequence | Switches of switch circuit | Circuit switch | Short circuit detection condition | Shorted switch | Prohibited motor |
|---|---|---|---|---|---|
| 1 | All switches OFF | OFF | Node voltage ≥ Voltage threshold | First input switch | First motor and second motor |
| 2 | All switches OFF | ON | Node voltage < Voltage threshold | First output switch or third output switch | First motor |
| 3 | Only third intermediate switch ON | OFF | Node voltage ≥ Voltage threshold | Second input switch or third input switch | Second motor |
| 4 | Only third intermediate switch ON | ON | Node voltage < Voltage threshold | Second output switch | Second motor |
| 5 | Only third input switch ON | OFF | Node voltage ≥ Voltage threshold | Third intermediate switch | First motor or second motor |

FIG. 13

Short circuit detection processing

| Sequence | Switches of switch circuit | Circuit switch | Short circuit detection condition | Shorted switch | Prohibited motor |
|---|---|---|---|---|---|
| 1 | All switches OFF | OFF | Node voltage ≥ Voltage threshold | First input switch | First motor and third motor |
| 2 | All switches OFF | ON | Node voltage < Voltage threshold | First output switch or third output switch N1 | First motor |
| 3 | Only third intermediate switch M1 ON | OFF | Node voltage ≥ Voltage threshold | Third input switch K1 | Second motor and third motor |
| 4 | Only third intermediate switch M1 ON | ON | Node voltage < Voltage threshold | Third output switch N2 | Third motor |
| 5 | Only third input switch K1 ON | OFF | Node voltage ≥ Voltage threshold | Third intermediate switch M1 | First motor or third motor |
| 6 | Only third intermediate switches M1, M2 ON | OFF | Node voltage ≥ Voltage threshold | Second input switch or third input switch K2 | Second motor |
| 7 | Only third intermediate switches M1, M2 ON | ON | Node voltage < Voltage threshold | Second output switch | Second motor |
| 8 | Only third input switch K2 and third intermediate switch M1 ON | OFF | Node voltage ≥ Voltage threshold | Third intermediate switch M2 | Second motor or third motor |

LEGEND
A= First connection circuit
B= Second connection circuit
C= Third connection circuit

FIG. 16

Short circuit detection processing

| Sequence | Switches of switch circuit | Circuit switch | Short circuit detection condition | Shorted switch | Prohibited motor |
|---|---|---|---|---|---|
| 1 | All switches OFF | ON | Node voltage ≥ Voltage threshold | First input switch | First motor and second motor |
| 2 | All switches OFF | OFF | Node voltage < Voltage threshold | First output switch or third output switch | First motor |
| 3 | Only third intermediate switch ON | ON | Node voltage ≥ Voltage threshold | Second input switch or third input switch | Second motor |
| 4 | Only third intermediate switch ON | OFF | Node voltage < Voltage threshold | Second output switch | Second motor |
| 5 | Only second input switch or third input switch ON | ON | Node voltage ≥ Voltage threshold | Third intermediate switch | First motor or second motor |

DRIVE DEVICE, SHORT CIRCUIT DETECTION METHOD, AND COMPUTER PROGRAM

CROSS-REFERENCE TO RELATED APPLICATIONS

This application is the U.S. national stage of PCT/JP2020/038613 filed on Oct. 13, 2020, which claims priority of Japanese Patent Application No. JP 2019-200125 filed on Nov. 1, 2019, the contents of which are incorporated herein.

TECHNICAL FIELD

The present disclosure relates to a drive device, a short circuit detection method, and a computer program.

BACKGROUND

JP 2015-51718A discloses a drive device for a vehicle, which drives a plurality of motors. This drive device rotates rotors of a first motor and a second motor. The rotation direction of the rotor of each of the first motor and the second motor differs depending on the direction of the current flowing through the motor. In the drive device described in JP 2015-51718A, a first circuit, a second circuit, and a third circuit are connected separately between the positive electrode and the negative electrode of a DC power supply. In each of the first circuit, the second circuit, and the third circuit, two switches are connected in series.

The first motor is connected between a connection node between the two switches that the first circuit has and a connection node between the two switches that the third circuit has. The second motor is connected between a connection node between the two switches that the second circuit has and a connection node between the two switches that the third circuit has.

When the switch on the positive electrode side of the first circuit and the switch on the negative electrode side of the third circuit are on, current flows through the first motor in a first direction and the first motor rotates in a forward direction. When the switch on the negative electrode side of the first circuit and the switch on the positive electrode side of the third circuit are on, current flows through the first motor in a second direction and the first motor rotates in a reverse direction. Likewise, when the switch on the negative electrode side of the second circuit and the switch on the positive electrode side of the third circuit are on, current flows through the second motor in the first direction and the second motor rotates in the forward direction. When the switch on the positive electrode side of the second circuit and the switch on the negative electrode side of the third circuit are on, current flows through the second motor in the second direction and the second motor rotates in the reverse direction.

In a conventional drive device in which a plurality of switches are arranged as described in JP 2015-51718A, the two switches of the third circuit are switched on or off when both the first motor and the second motor are operating, when the first motor is operating alone, and when the second motor is operating alone. As a result, the two switches of the third circuit are switched more frequently, and there is thus a high likelihood of a short circuit occurring in each of the two switches of the third circuit.

When both ends of one of the two switches of the third circuit are shorted, the current that can flow to the first motor and the second motor, respectively, is limited to the current in one of the first direction and the second direction. Accordingly, if both ends of one of the two switches of the third circuit are shorted, the first motor and the second motor will not be able to function as motors capable of rotating in both the forward direction and the reverse direction.

Accordingly, an object is to provide a drive device that can rotate at least one motor in a forward direction and a reverse direction even when both ends of one switch are shorted in a series circuit including a plurality of switches connected to two motors, as well as a short circuit detection method and a computer program for detecting a short circuit in a switch provided in the drive device.

SUMMARY

A drive device according to one aspect of the present disclosure is a drive device that drives a first motor and a second motor, the first motor and the second motor rotating in different directions depending on a direction of current flowing therethrough. The drive device includes a first connection circuit, a second connection circuit, and a third connection circuit, each connected individually between an input end to which current is input and an output end from which current is output. In the first connection circuit, two first switches are connected in series. In the second connection circuit, two second switches are connected in series. In the third connection circuit, three third switches are connected in series. The first motor is connected between a first connection node, which is between the two first switches, and a connection node between two of the third switches on the output end side. The second motor is connected between a second connection node, which is between the two second switches, and a connection node between two of the third switches on the input end side.

A short circuit detection method according to one aspect of the present disclosure is a method of a computer executing: a step of switching a circuit switch of a drive device on or off, the drive device including two first switches, two second switches, three third switches, and a series circuit in which a first resistor, a second resistor, and the circuit switch are connected in series and a constant voltage is applied to the series circuit, and the drive device driving a first motor and a second motor, the first motor and the second motor rotating in different directions depending on a direction of current flowing therethrough; a step of obtaining voltage information indicating a node voltage of a resistor connection node between the first resistor and the second resistor; and a step of detecting a short circuit in one of the two first switches, the two second switches, and the three third switches based on the voltage information obtained. The drive device further includes a first connection circuit, a second connection circuit, and a third connection circuit individually connected between an input end to which current is input and an output end from which current is output. In the first connection circuit, the two first switches are connected in series. In the second connection circuit, the two second switches are connected in series. In the third connection circuit, the three third switches are connected in series. The first motor is connected between a first connection node, which is between the two first switches, and a connection node between two of the third switches on the output end side. The second motor is connected between a second connection node, which is between the two second switches, and a connection node between two of the third switches on the input end side. The resistor connection node is connected to the first connection node.

A computer program according to one aspect of the present disclosure is used to cause a computer to execute: a step of switching a circuit switch of a drive device on or off, the drive device including two first switches, two second switches, three third switches, and a series circuit in which a first resistor, a second resistor, and the circuit switch are connected in series and a constant voltage is applied to the series circuit, and the drive device driving a first motor and a second motor, the first motor and the second motor rotating in different directions depending on a direction of current flowing therethrough; a step of obtaining voltage information indicating a node voltage of a resistor connection node between the first resistor and the second resistor; and a step of detecting a short circuit in one of the two first switches, the two second switches, and the three third switches based on the voltage information obtained. The drive device further includes a first connection circuit, a second connection circuit, and a third connection circuit individually connected between an input end to which current is input and an output end from which current is output. In the first connection circuit, the two first switches are connected in series. In the second connection circuit, the two second switches are connected in series. In the third connection circuit, the three third switches are connected in series. The first motor is connected between a first connection node, which is between the two first switches, and a connection node between two of the third switches on the output end side. The second motor is connected between a second connection node, which is between the two second switches, and a connection node between two of the third switches on the input end side. The resistor connection node is connected to the first connection node.

Effects of the Present Disclosure

According to the drive device according to the present disclosure, at least one motor can be rotated in both the forward direction and the reverse direction even when both ends of one switch are shorted in a third connection circuit.

According to the short circuit detection method and computer program of the present disclosure, a short circuit of a switch provided in a drive device is detected.

BRIEF DESCRIPTION OF DRAWINGS

FIG. 3 is a diagram illustrating a driving method of a first motor and a second motor.

FIG. 4 is a diagram illustrating PWM switches for the first motor and the second motor.

FIG. 6 is a diagram illustrating a short circuit detection processing sequence.

FIG. 13 is a diagram illustrating a short circuit detection processing sequence.

FIG. 16 is a diagram illustrating a short circuit detection processing sequence.

DETAILED DESCRIPTION OF PREFERRED EMBODIMENTS

Figure 1:
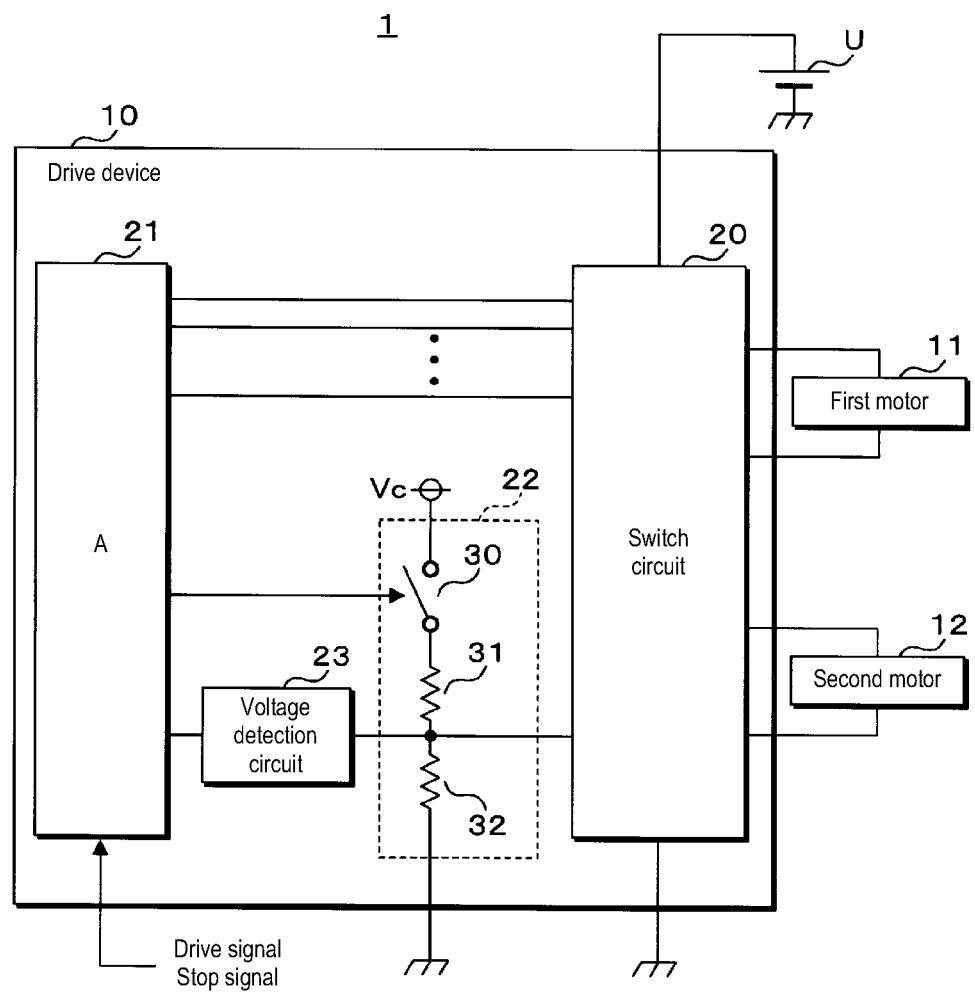
FIG. 1 is a block diagram illustrating the primary configuration of a power supply system according to a first embodiment.

First, embodiments of the present disclosure will be described as examples. The embodiments described hereinafter may be at least partially combined as desired.

A drive device according to one aspect of the present disclosure is a drive device that drives a first motor and a second motor, the first motor and the second motor rotating in different directions depending on a direction of current flowing therethrough. The drive device includes a first connection circuit, a second connection circuit, and a third connection circuit, each connected individually between an input end to which current is input and an output end from which current is output. In the first connection circuit, two first switches are connected in series. In the second connection circuit, two second switches are connected in series. In the third connection circuit, three third switches are connected in series. The first motor is connected between a first connection node, which is between the two first switches, and a connection node between two of the third switches on the output end side. The second motor is connected between a second connection node, which is between the two second switches, and a connection node between two of the third switches on the input end side.

The drive device according to one aspect of the present disclosure further includes: a series circuit in which a first resistor, a second resistor, and a circuit switch are connected in series and a resistor connection node between the first resistor and the second resistor is connected to the first connection node, a constant voltage being applied to the series circuit; and a processing unit that executes processing. The processing unit executes processing of: switching the circuit switch on or off; obtaining voltage information indicating a node voltage at the resistor connection node; and detecting a short circuit in one of the two first switches, the two second switches, and the three third switches based on the voltage information obtained.

In the drive device according to one aspect of the present disclosure, the resistor connection node is a connection node on a downstream side of the circuit switch, and the processing unit executes processing of: obtaining the voltage information in a case where the two first switches, the two second switches, and the three third switches are instructed to switch off and the circuit switch is on; and detecting a short circuit in a first switch on the input end side based on the voltage information obtained.

In the drive device according to one aspect of the present disclosure, the resistor connection node is a connection node on a downstream side of the circuit switch, and the processing unit executes processing of: obtaining the voltage information in a case where the two first switches, the two second switches, and the three third switches are instructed to switch off and the circuit switch is on; and detecting a short circuit in a first switch on the output end side or a third switch on the output end side based on the voltage information obtained.

In the drive device according to one aspect of the present disclosure, the resistor connection node is a connection node on a downstream side of the circuit switch, and the processing unit executes processing of: obtaining the voltage information in a case where the two first switches, the two second switches, a third switch on the input end side, and the third switch on the output end side are instructed to switch off, a third switch connected between the third switch on the input end side and the third switch on the output end side is instructed to switch on, and the circuit switch is off; and detecting a short circuit in a second switch on the input end side or the third switch on the input end side based on the voltage information obtained.

In the drive device according to one aspect of the present disclosure, the resistor connection node is a connection node on a downstream side of the circuit switch, and the processing unit executes processing of: obtaining the voltage information in a case where the two first switches, the two second switches, the third switch on the input end side, and the third switch on the output end side are instructed to switch off, a third switch connected between the third switch on the input end side and the third switch on the output end side are instructed to switch on, and the circuit switch is on; and detecting a short circuit in a second switch on the output end side based on the voltage information obtained.

In the drive device according to one aspect of the present disclosure, the resistor connection node is a connection node on a downstream side of the circuit switch, and the processing unit executes processing of: obtaining the voltage information in a case where one or both of the second switch on the input end side and the third switch on the input end side are instructed to switch on, remaining switches among the two first switches, the two second switches, and the three third switches are instructed to switch off, and the circuit switch is off; and detecting a short circuit in a third switch connected between the third switch on the input end side and the third switch on the output end side based on the voltage information obtained.

In the drive device according to one aspect of the present disclosure, when a short circuit is detected in the first switch on the output end side or the third switch on the output end side, the processing unit executes processing for driving only the second motor by instructing the two second switches and the three third switches to switch on or off individually.

In the drive device according to one aspect of the present disclosure, when a short circuit is detected in one of the two second switches and the third switch on the input end side, the processing unit executes processing for driving only the first motor by instructing the two first switches and the three third switches to switch on or off individually.

In the drive device according to one aspect of the present disclosure, the processing unit executes processing of: determining whether to drive the first motor when a short circuit is detected in the third switch connected between the third switch on the input end side and the third switch on the output end side; and driving the second motor when it is determined that the first motor is not to be driven.

In the drive device according to one aspect of the present disclosure, the processing unit executes processing of: determining whether to drive the second motor when a short circuit is detected in the third switch connected between the third switch on the input end side and the third switch on the output end side; and driving the first motor when it is determined that the second motor is not to be driven.

In the drive device according to one aspect of the present disclosure, there are at least two of the third connection circuits. The first motor is connected between a connection node between the two first switches, and an output-side connection node, which is between two of the third switches on the output end side of one of the third connection circuits. The second motor is connected between the connection node between the two second switches, and an input-side connection node, which is between two of the third switches on the input end side of a third connection circuit, among the third connection circuits, that is different from the third connection circuit to which the first motor is connected. A third motor is connected between the input-side connection node of one of two of the third connection circuits and the output-side connection node of the other of the two third connection circuits, the third motor rotating in different directions depending on a direction of current flowing therethrough. One motor is connected to each of the input-side connection node and the output-side connection node of each of the third connection circuits.

In short circuit detection method according to one aspect of the present disclosure, a computer executes: a step of switching a circuit switch of a drive device on or off, the drive device including two first switches, two second switches, three third switches, and a series circuit in which a first resistor, a second resistor, and the circuit switch are connected in series and a constant voltage is applied to the series circuit, and the drive device driving a first motor and a second motor, the first motor and the second motor rotating in different directions depending on a direction of current flowing therethrough; a step of obtaining voltage information indicating a node voltage of a connection node between the first resistor and the second resistor; and a step of detecting a short circuit in one of the two first switches, the two second switches, and the three third switches based on the voltage information obtained. The drive device further includes a first connection circuit, a second connection circuit, and a third connection circuit individually connected between an input end to which current is input and an output end from which current is output. In the first connection circuit, the two first switches are connected in series. In the second connection circuit, the two second switches are connected in series. In the third connection circuit, the three third switches are connected in series. The first motor is connected between a first connection node, which is between the two first switches, and a connection node between two of the third switches on the output end side. The second motor is connected between a second connection node, which is between the two second switches, and a connection node between two of the third switches on the input end side. The resistor connection node is connected to the first connection node.

A computer program according to one aspect of the present disclosure is used to cause a computer to execute: a step of switching a circuit switch of a drive device on or off, the drive device including two first switches, two second switches, three third switches, and a series circuit in which a first resistor, a second resistor, and the circuit switch are connected in series and a constant voltage is applied to the series circuit, and the drive device driving a first motor and a second motor, the first motor and the second motor rotating in different directions depending on a direction of current flowing therethrough; a step of obtaining voltage information indicating a node voltage of a connection node between the first resistor and the second resistor; and a step of detecting a short circuit in one of the two first switches, the two second switches, and the three third switches based on the voltage information obtained. The drive device further includes a first connection circuit, a second connection circuit, and a third connection circuit individually connected between an input end to which current is input and an output end from which current is output. In the first connection circuit, the two first switches are connected in series. In the second connection circuit, the two second switches are connected in series. In the third connection circuit, the three third switches are connected in series. The first motor is connected between a first connection node, which is between the two first switches, and a connection node between two of the third switches on the output end side. The second motor is connected between a second connection node, which is between the two second switches, and a connection node between two of the third switches on the input end side. The resistor connection node is connected to the first connection node.

In the drive device according to one of the above aspects, one end of the first motor is connected to the first connection node between the two first switches. One end of the second motor is connected to the connection node between the two second switches. Rotation can be realized in both the forward direction and the reverse direction for a motor connected between a connection node between two normal switches and a connection node between another two normal switches. Even if both ends of one of the three third switches are shorted, the other end of the first motor or the second motor is connected to the connection node between the remaining two third switches. Accordingly, even if both ends of one of the third switches of the third connection circuit connected to the first motor and the second motor have shorted, the first motor or the second motor can be rotated in the forward direction and the reverse direction.

In the drive device, the short circuit detection method, and the computer program according to one of the above aspects, the resistor connection node is, for example, a connection node on the downstream side of the circuit switch. When the two first switches, the two second switches, the third switch on the input end side, and the third switch on the output end side are off and the circuit switch is on, the node voltage at the resistor connection node is a divided voltage obtained by the first resistor and the second resistor dividing the constant voltage. In the same situation, when the circuit switch is off, the node voltage is zero V. If the node voltage differs from the expected voltage, the processing unit detects a short circuit in one of the two first switches, the two second switches, and the three third switches.

In the drive device according to one of the above aspects, for example, a DC voltage is applied to the input end and the output end, the DC voltage is at least the constant voltage, and a voltage threshold is greater than zero V and no greater than the divided voltage. It is assumed that one switch is to be shorted. When the two first switches, the two second switches, and the three third switches are off and the circuit switch is off, the node voltage is zero V, which is less than the voltage threshold. If both ends of the first switch on the input end side are shorted, the node voltage is the DC voltage, and is at least the voltage threshold. Accordingly, when the node voltage is at least the voltage threshold, a short circuit is detected in the first switch on the input end side.

In the drive device according to one of the above aspects, the DC voltage is applied and the voltage threshold is set as described above, for example. It is assumed that one switch is to be shorted, and the resistance value of the resistor, among the first resistor and the second resistor, which is located on the upstream side is sufficiently higher than the resistance component value of the first motor. When the two first switches, the two second switches, and the three third switches are off and the circuit switch is on, the node voltage is the divided voltage, which is at least the voltage threshold. If both ends of the first switch on the output end side or the third switch on the output end side are shorted, the node voltage is substantially zero V, which is less than the voltage threshold. Accordingly, when the node voltage is less than the voltage threshold, a short circuit is detected in the first switch on the output end side or the third switch on the output end side.

In the drive device according to one of the above aspects, the DC voltage is applied and the voltage threshold is set as described above, for example. It is assumed that one switch is to be shorted, that the resistance value of the resistor, among the first resistor and the second resistor, which is located on the downstream side is sufficiently higher than the resistance component values of the first motor and the second motor, and that no short circuit has occurred in the two first switches and the third switch on the output end side. These short circuits are detected, for example, by the method described above. In the following, the third switch connected between the third switch on the input end side and the third switch on the output end side will be referred to as a "third intermediate switch".

When the two first switches, the two second switches, the third switch on the input end side, and the third switch on the output end side are off, and the third intermediate switch is on, the node voltage is zero V, which is less than the voltage threshold, when the circuit switch is off. If both ends of the second switch on the input end side or the third switch on the input end side are shorted, the node voltage is substantially the DC voltage, which is at least the voltage threshold. Accordingly, when the node voltage is at least the voltage threshold, a short circuit is detected in the second switch on the input end side or the third switch on the input end side.

In the drive device according to one of the above aspects, the DC voltage is applied and the voltage threshold is set as described above, for example. It is assumed that one switch is to be shorted, that the resistance value of the resistor, among the first resistor and the second resistor, which is located on the upstream side is sufficiently higher than the resistance component values of the first motor and the second motor, and that no short circuit has occurred in the two first switches, the second switch on the input end side, and the three third switches. These short circuits are detected, for example, by the method described above. When the two first switches, the two second switches, the third switch on the input end side, and the third switch on the output end side are off and the third intermediate switch is on, the node voltage is the divided voltage, which is at least the voltage threshold, when the circuit switch is on. If both ends of the second switch on the output end side are shorted, the node voltage is substantially zero V, which is less than the voltage threshold. Accordingly, when the node voltage is less than the voltage threshold, a short circuit is detected in the second switch on the output end side.

In the drive device according to one of the above aspects, the DC voltage is applied and the voltage threshold is set as described above, for example. It is assumed that one switch is to be shorted, and the resistance value of the resistor, among the first resistor and the second resistor, which is located on the downstream side is sufficiently higher than the resistance component values of the first motor and the second motor. Furthermore, it is assumed that no short circuit has occurred in the two first switches, the two second switches, the third switch on the input end side, and the third switch on the output end side. These short circuits are detected, for example, by the method described above.

When, among the two first switches, the two second switches, and the three third switches, one or both of the second switch on the input end side and the third switch on the input end side are on and the other is off, the node voltage is zero V, which is less than the voltage threshold, when the circuit switch is off. If both ends of the third intermediate switch are shorted, the node voltage is substantially the DC voltage, and is at least the voltage threshold. Accordingly, when the node voltage is at least the voltage threshold, a short circuit is detected in the third intermediate switch.

In the drive device according to one of the above aspects, when both ends of the first switch on the output end side or the third switch on the output end side are shorted, the rotation direction of the first motor is limited to one of the forward direction and the reverse direction, and thus only the second motor is driven.

In the drive device according to one of the above aspects, when both ends of one of the two second switches and the third switch on the input end side are shorted, the rotation direction of the second motor is limited to one of the forward direction and the reverse direction, and thus only the first motor is driven.

In the drive device according to one of the above aspects, if both ends of the third intermediate switch are shorted, when one of the first motor and the second motor is rotating, the rotation direction of the other motor is limited to one of the forward direction and the reverse direction. When the first motor is driven, the second motor is not driven. The second motor is driven only when the first motor is not driven.

In the drive device according to one of the above aspects, if both ends of the third intermediate switch are shorted, when one of the first motor and the second motor is rotating, the rotation direction of the other motor is limited to one of the forward direction and the reverse direction. When the second motor is driven, the first motor is not driven. The first motor is driven only when the second motor is not driven.

In the drive device according to one of the above aspects, one end of the first motor is connected to the first connection node between the two first switches. One end of the second motor is connected to the connection node between the two second switches. Even if both ends of one of the third switches of one of the third connection circuits are shorted, the other end of the first motor or the second motor is connected to the connection node between two normal third switches. Even if both ends of one of the third switches of the third connection circuit to which two of the first motor, the second motor, and the third motor are connected are shorted, at least one of the first motor, the second motor, and the third motor can be rotated in the forward direction and the reverse direction.

Specific examples of the power supply system according to embodiments of the present disclosure will be described hereinafter with reference to the drawings. Note that the present invention is not intended to be limited to these examples, and is defined instead by the scope of the appended claims. All changes that fall within the same essential spirit as the scope of the claims are intended to be included therein as well.

First Embodiment

Configuration of Power Supply System

FIG. 1 is a block diagram illustrating the primary configuration of a power supply system 1 according to the first embodiment. The power supply system 1 is preferably installed in a vehicle, and includes a drive device 10, a first motor 11, a second motor 12, and a DC power supply U. The DC power supply U is, for example, a battery. The drive device 10 is connected to one end and another end of the first motor 11, and to one end and another end of the second motor 12. The drive device 10 is further connected to the positive electrode of the DC power supply U. The drive device 10 and the negative electrode of the DC power supply U are grounded.

Each of the first motor 11 and the second motor 12 rotates a door mirror, adjusts the angle of a seat backrest, opens and closes a window, or the like, relative to an installation location in the vehicle body. When current flows through the first motor 11, the first motor 11 rotates. Rotation of the first motor 11 means that a rod-shaped rotor of the first motor 11 rotates about an axis. When the direction of current flowing through the first motor 11 is a first direction, and specifically, the downward direction in FIG. 1, the first motor 11 rotates in the forward direction. When the direction of current flowing through the first motor 11 is a second direction, and specifically, the upward direction in FIG. 1, the first motor 11 rotates in the reverse direction. When the supply of current to the first motor 11 stops, the first motor 11 stops rotating.

The second motor 12 is configured in the same manner as the first motor 11.

Accordingly, when the direction of current flowing through the second motor 12 is the first direction, the second motor 12 rotates in the forward direction. When the direction of current flowing through the second motor 12 is the second direction, the second motor 12 rotates in the reverse direction. When the supply of current to the second motor 12 stops, the second motor 12 stops rotating.

For the first motor 11 and the second motor 12, the forward direction is clockwise or counterclockwise. When the forward direction is clockwise, the reverse direction is counterclockwise. When the forward direction is counterclockwise, the reverse direction is clockwise. The forward direction may be the same for both the first motor and the second motor, or may be different.

The drive device 10 drives the first motor 11 and the second motor 12. When rotating the first motor 11 or the second motor 12 in the forward direction, the drive device 10 supplies current in the first direction to the first motor 11 or the second motor 12. When rotating the first motor 11 or the second motor 12 in the reverse direction, the drive device 10 supplies current in the second direction to the first motor 11 or the second motor 12. The current supplied to the first motor 11 and the second motor 12 is output from the DC power supply U. When stopping the driving of the first motor 11 or the second motor 12, the drive device 10 stops the supply of current from the DC power supply U to the first motor 11 or the second motor 12.

A drive signal instructing the driving of one or both of the first motor 11 and the second motor 12 is input to the drive device 10. The drive signal indicates a driving motor to be driven, among the first motor 11 and the second motor 12, and the rotation direction of the driving motor. The rotation direction is the forward direction or the reverse direction. A stop signal indicating the operations of the first motor 11 and the second motor 12 are to be stopped is input to the drive device 10.

When the drive signal is input to the drive device 10, the drive device 10 drives one or both of the first motor 11 and the second motor 12 according to the content of the input drive signal. For example, if a drive signal indicating that the first motor 11 and the second motor 12 are to rotate in the forward direction, the drive device 10 causes the first motor 11 and the second motor 12 to rotate in the forward direction.

When the stop signal is input to the drive device 10, the drive device 10 causes the first motor 11 and the second motor 12 to stop operating.

Configuration of Drive Device 10

The drive device 10 includes a switch circuit 20, a microcomputer 21, a series circuit 22, and a voltage detection circuit 23. The series circuit 22 includes a circuit switch 30, a first resistor 31, and a second resistor 32. In the series circuit 22, the circuit switch 30, the first resistor 31, and the second resistor 32 are connected in series. A constant voltage Vc, with the ground potential being a reference, is applied to one end of the circuit switch 30. One end of the first resistor 31 is connected to the other end of the circuit switch 30. The other end of the first resistor 31 is connected to one end of the second resistor 32. The other end of the second resistor 32 is grounded.

In the following, the voltage at the positive electrode of the DC power supply U, with the ground potential being a reference, will be referred to as a "power supply voltage", and a connection node between the first resistor 31 and the second resistor 32 will be referred to as a "resistor connection node". The constant voltage Vc is lower than the power supply voltage, and is generated, for example, by a regulator stepping down the power supply voltage.

The switch circuit 20 is connected to the positive electrode of the DC power supply U, one end and another end of the first motor 11, and one end and another end of the second motor 12. The switch circuit 20 is further connected to the microcomputer 21 and the resistor connection node in the series circuit 22. The resistor connection node is further connected to the voltage detection circuit 23. The voltage detection circuit 23 is further connected to the microcomputer 21.

The switch circuit 20 includes a plurality of switches. The microcomputer 21 instructs each of the plurality of switches to turn on and off individually. Each of the plurality of switches switches on and off in response to instructions from the microcomputer 21. Through this, the switch circuit 20 supplies current in the first direction or the second direction to each of the first motor 11 and the second motor 12, and stops the supply of current to each of the first motor 11 and the second motor 12.

In the following, the voltage at the resistor connection node with the ground potential as a reference will be referred to as a "node voltage". The voltage detection circuit 23 detects the node voltage. The voltage detection circuit 23 outputs, to the microcomputer 21, analog voltage information indicating the detected node voltage. The analog voltage information is, for example, a voltage obtained by dividing the node voltage.

The microcomputer 21 switches the circuit switch 30 on or off. Based on the voltage information input when the circuit switch 30 is on or off, the microcomputer 21 detects a short circuit in a switch in the switch circuit 20. A "short circuit in a switch" means that the switch is fixed to on and the switch cannot be switched to off.

Configuration of Switch Circuit 20

Figure 2:
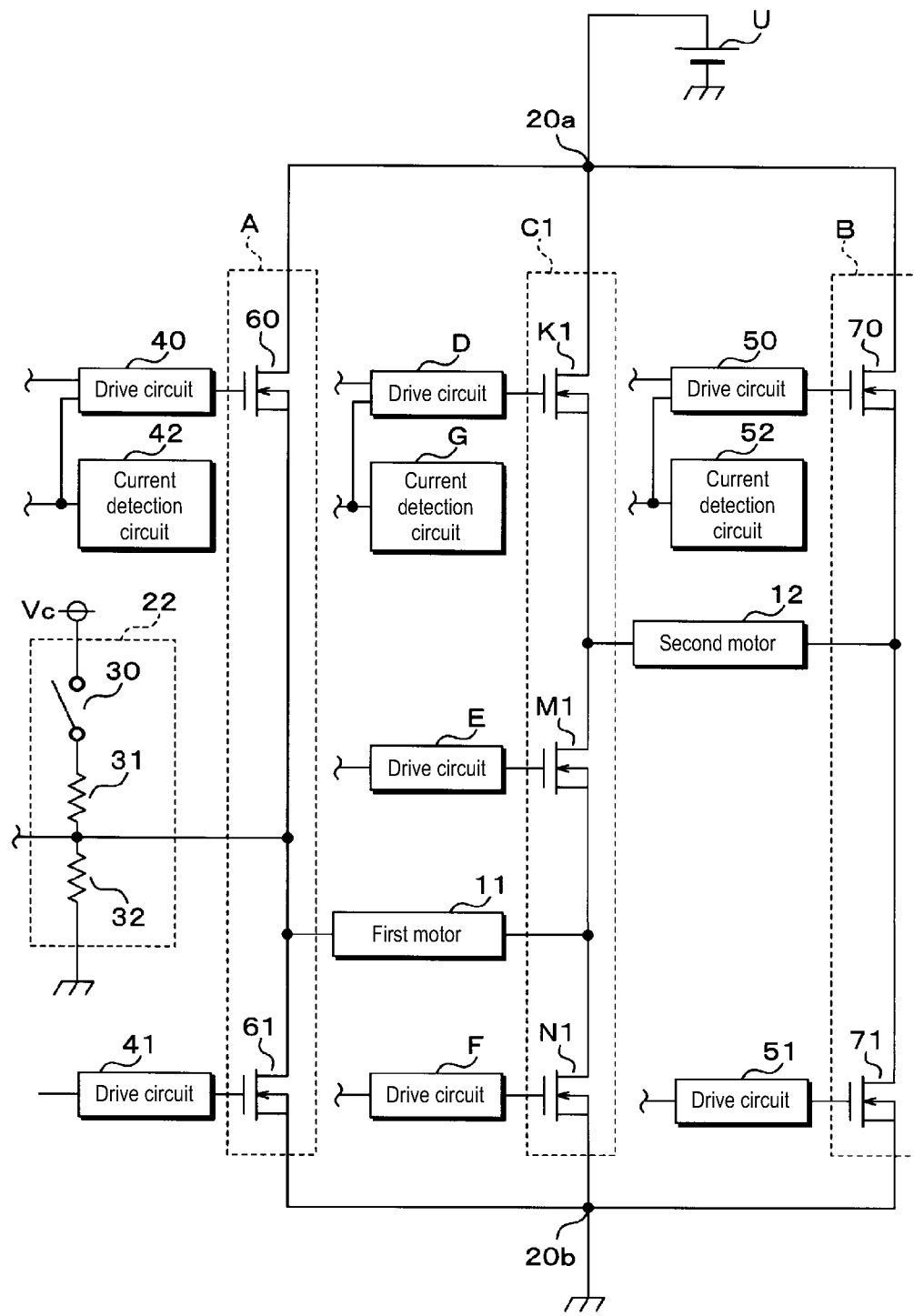
FIG. 2 is a circuit diagram illustrating the configuration of a switch circuit.

FIG. 2 is a circuit diagram illustrating the configuration of the switch circuit 20. The switch circuit 20 includes an input end 20a and an output end 20b. The input end 20a is connected to the positive electrode of the DC power supply U. The output end 20b is grounded. Current is input to the input end 20a from the positive electrode of the DC power supply U. The current is output from the output end 20b.

In addition to the input end 20a and the output end 20b, the switch circuit 20 includes drive circuits 40, 41, 50, 51, D, E, and F, current detection circuits 42, 52, and G, a first connection circuit A, a second connection circuit B, and a third connection circuit C1. The first connection circuit A includes a first input switch 60 and a first output switch 61. The second connection circuit B includes a second input switch 70 and a second output switch 71. The third connection circuit C1 includes a third input switch K1, a third intermediate switch M1, and a third output switch N1. The first input switch 60, the first output switch 61, the second input switch 70, the second output switch 71, the third input switch K1, the third intermediate switch M1, and the third output switch N1 are N-channel Field Effect Transistors (FETs).

In the first connection circuit A, the first input switch 60 and the first output switch 61 are connected in series. Specifically, the source of the first input switch 60 is connected to the drain of the first output switch 61. Each of the first input switch 60 and the first output switch 61 functions as a first switch. In the second connection circuit B, the second input switch 70 and the second output switch 71 are connected in series. Specifically, the source of the second input switch 70 is connected to the drain of the second output switch 71. Each of the second input switch 70 and the second output switch 71 functions as a second switch.

In the following, a connection node between the first input switch 60 and the first output switch 61 will be referred to as a "first connection node". Furthermore, a connection node between the second input switch 70 and the second output switch 71 will be referred to as a "second connection node".

In the third connection circuit C1, the third input switch K1, the third intermediate switch M1, and the third output switch N1 are connected in series.

Specifically, the source of the third input switch K1 is connected to the drain of the third intermediate switch M1. The source of the third intermediate switch M1 is connected to the drain of the third output switch. The third input switch K1, the third intermediate switch M1, and the third output switch N1 function as third switches.

The drains of the first input switch 60, the second input switch 70, and the third input switch K1 are connected to the input end 20a. The sources of the first output switch 61, the second output switch 71, and the third output switch N1 are connected to the output end 20b. Accordingly, the first connection circuit A, the second connection circuit B, and the third connection circuit C1 are connected individually between the input end 20a and the output end 20b.

The first motor 11 is connected between the first connection node, and a connection node between the third intermediate switch M1 and the third output switch N1. The second motor 12 is connected between the second connection node, and a connection node between the third input switch K1 and the third intermediate switch M1. The first connection node is further connected to the resistor connection node in the series circuit 22.

The first input switch 60, the first output switch 61, the second input switch 70, the second output switch 71, the third input switch K1, the third intermediate switch M1, and the third output switch N1 are connected to the drive circuits 40, 41, 50, 51, D, E, and F, respectively. The drive circuits 40, 41, 50, 51, D, E, and F are further connected to the microcomputer 21. The drive circuits 40, 50, and D are connected to the current detection circuits 42, 52, and G, respectively. The current detection circuits 42, 52, and G are further connected to the microcomputer 21.

In the first input switch 60, if a gate voltage relative to a source potential is at least a set reference voltage, the resistance value between the drain and the source will be sufficiently low. At this time, the first input switch 60 is on, and current can flow via the drain and the source. In the first input switch 60, if the gate voltage relative to the source potential is less than the reference voltage, the resistance value between the drain and the source will be sufficiently high. At this time, the first input switch 60 is off, and no current flows via the drain and the source.

Each of the first output switch 61, the second input switch 70, the second output switch 71, the third input switch K1, the third intermediate switch M1, and the third output switch N1 functions in the same manner as the first input switch 60. The reference voltage of each of the first input switch 60, the first output switch 61, the second input switch 70, the second output switch 71, the third input switch K1, the third intermediate switch M1, and the third output switch N1 may differ from the reference voltages of the other switches.

The drive circuits 40, 41, 50, 51, D, E, and F switch the first input switch 60, the first output switch 61, the second input switch 70, the second output switch 71, the third input switch K1, the third intermediate switch M1, and the third output switch N1 on or off, respectively. When switching the first input switch 60 on, the drive circuit 40 increases the gate voltage of the first input switch 60, which takes the ground potential as a reference. Through this, in the first input switch 60, the gate voltage relative to the source potential becomes at least the reference voltage, and the first input switch 60 switches on. When switching the first input switch 60 off, the drive circuit 40 reduces the gate voltage of the first input switch 60, which takes the ground potential as a reference. Through this, in the first input switch 60, the gate voltage relative to the source potential becomes less than the reference voltage, and the first input switch 60 switches off.

Like the drive circuit 40, the drive circuits 41, 50, 51, D, E, and F switch the first output switch 61, the second input switch 70, the second output switch 71, the third input switch K1, the third intermediate switch M1, and the third output switch N1 on or off, respectively.

A current detection circuit 42 is configured using a current mirror circuit, for example, and detects current flowing via the first input switch 60. The current detection circuit 42 outputs analog current information indicating the detected current to the microcomputer 21 and the drive circuit 40. The current information is, for example, a voltage proportional to the current flowing via the first input switch 60.

Like the current detection circuit 42, the current detection circuits 52 and G detect current flowing via the second input switch 70 and the third input switch K1, respectively. The current detection circuit 52 outputs analog current information indicating the detected current to the microcomputer 21 and the drive circuit 50. The current detection circuit G outputs analog current information indicating the detected current to the microcomputer 21 and the drive circuit D.

A high-level voltage indicating a switch to on or a low-level voltage indicating a switch to off is input from the microcomputer 21 to each of the drive circuits 40, 41, 50, 51, D, E, and F. In the following, the voltage input to a drive circuit to switch the switch on or off will be referred to as an "input voltage".

When the current indicated by the input current information is less than a current threshold, and the input voltage switches to the high-level voltage, the drive circuit 40 switches the first input switch 60 on. In the same case, when the input voltage switches to the low-level voltage, the drive circuit 40 switches the first input switch 60 off. When the current indicated by the input current information becomes at least the current threshold, the drive circuit 40 switches the first input switch 60 off regardless of the input voltage. The drive circuit 40 then keeps the first input switch 60 off regardless of the current indicated by the input current information.

Like the drive circuit 40, the drive circuits 50 and D switch the second input switch 70 and the third input switch K1 on or off, respectively.

The drive circuits 41, 51, E, and F switch the first output switch 61, the second output switch 71, the third intermediate switch M1, and the third output switch Ni on, respectively, when the input voltage switches to the high-level voltage. The drive circuits 41, 51, E, and F switch the first output switch 61, the second output switch 71, the third intermediate switch M1, and the third output switch N1 off, respectively, when the input voltage switches to the low-level voltage.

The microcomputer 21 switches the input voltages of the drive circuits 40, 41, 50, 51, D, E, and F to the high-level voltage or the low-level voltage individually. Through this, the microcomputer 21 switches the first input switch 60, the first output switch 61, the second input switch 70, the second output switch 71, the third input switch K1, the third intermediate switch M1, and the third output switch N1 on or off individually, and drives the first motor 11 and the second motor 12. With respect to the first motor 11 and the second motor 12, current in the first direction corresponds to the right direction in FIG. 2, and current in the second direction corresponds to the left direction in FIG. 2.

Driving Method of First Motor 11 and Second Motor 12

FIG. 3 is a diagram illustrating a driving method of the first motor 11 and the second motor 12. The "—" written in the columns for the first motor 11 and the second motor 12 indicates that operations are stopped. The "—" written in the columns for the first input switch 60, the first output switch 61, the second input switch 70, the second output switch 71, the third input switch K1, the third intermediate switch M1, and the third output switch N1 indicates "off".

When rotating the first motor 11 in the forward direction, the first input switch 60 and the third output switch N1 are switched on, and the remaining switches of the switch circuit 20 are switched off. Current in the first direction flows through the first motor 11 as a result. When rotating the first motor 11 in the reverse direction, the first output switch 61, the third input switch K1, and the third intermediate switch M1 are switched on, and the remaining switches of the switch circuit 20 are switched off. Current in the second direction flows through the first motor 11 as a result.

When rotating the second motor 12 in the forward direction, the third input switch K1 and the second output switch 71 are switched on, and the remaining switches of the switch circuit 20 are switched off. Current in the first direction flows through the second motor 12 as a result. When rotating the second motor 12 in the reverse direction, the third intermediate switch M1, the third output switch N1, and the second input switch 70 are switched on, and the remaining switches of the switch circuit 20 are switched off. Current in the second direction flows through the second motor 12 as a result.

When rotating the first motor 11 and the second motor 12 in the forward direction, the first input switch 60, the third input switch K1, the third output switch N1, and the second output switch 71 are switched on, and the remaining switches of the switch circuit 20 are switched off. Current in the first direction flows through the first motor 11 and the second motor 12 as a result.

When rotating the first motor 11 and the second motor 12 in the forward direction and the reverse direction, respectively, the first input switch 60, the third intermediate switch M1, the third output switch N1, and the second input switch 70 are switched on, and the remaining switches of the switch circuit 20 are switched off. Current in the first direction flows through the first motor 11, and current in the second direction flows through the second motor 12, as a result.

When rotating the first motor 11 and the second motor 12 in the reverse direction and the forward direction, respectively, the first output switch 61, the third input switch K1, the third intermediate switch M1, and the second output switch 71 are switched on, and the remaining switches of the switch circuit 20 are switched off. Current in the second direction flows through the first motor 11, and current in the first direction flows through the second motor 12, as a result.

When rotating the first motor 11 and the second motor 12 in the reverse direction, the first output switch 61, the third intermediate switch M1, and the second input switch 70 are switched on, and the remaining switches of the switch circuit 20 are switched off. Current in the second direction flows through the first motor 11 and the second motor 12 as a result.

Adjusting Rotation Speed of First Motor 11 and Second Motor 12

The rotation speeds of the first motor 11 and the second motor 12 are proportional to the average values of the currents supplied to the first motor 11 and the second motor 12, respectively. Accordingly, the rotation speeds of the first motor 11 and the second motor 12 can be adjusted through Pulse Width Modulation (PWM) control of at least one of the switches of the switch circuit 20. A switch subject to PWM control will be referred to as a "PWM switch" hereinafter.

PWM control is control in which a switch is repeatedly switched on and off in an alternating manner. The switching of a switch on or off is performed cyclically. The average value of the current flowing through the first motor 11 or the second motor 12 is adjusted by adjusting the percentage of the period a switch is on in a single cycle, i.e., the duty cycle. The higher the duty cycle, the higher the average value of the current.

FIG. 4 is a diagram illustrating PWM switches for the first motor 11 and the second motor 12. As illustrated in FIG. 4, PWM control is performed on the first input switch 60 or the third output switch N1 when rotating the first motor 11 in the forward direction. PWM control is performed on the first output switch 61, the third input switch K1, or the third intermediate switch M1 when rotating the first motor 11 in the reverse direction.

PWM control is performed on the second output switch 71 or the third input switch K1 when rotating the second motor 12 in the forward direction. PWM control is performed on the second input switch 70, the third intermediate switch M1, or the third output switch N1 when rotating the second motor 12 in the reverse direction.

When rotating the first motor 11 and the second motor 12 in the forward direction, the rotation speed of the first motor 11 is adjusted by performing PWM control for the first input switch 60 or the third output switch N1. The rotation speed of the second motor 12 is adjusted by performing PWM control for the second output switch 71 or the third input switch K1.

When rotating the first motor 11 and the second motor 12 in the forward direction and the reverse direction, respectively, the rotation speed of the first motor 11 is adjusted by performing PWM control for the first input switch 60 or the third output switch N1. The rotation speed of the second motor 12 is adjusted by performing PWM control for the second input switch 70, the third intermediate switch M1, or the third output switch N1. Here, when PWM control is performed for the third output switch N1, the currents supplied to the first motor 11 and the second motor 12 is adjusted, and the rotation speeds of the first motor 11 and the second motor 12 are adjusted.

When rotating the first motor 11 and the second motor 12 in the reverse direction and the forward direction, respectively, the rotation speed of the first motor 11 is adjusted by performing PWM control for the first output switch 61, the third input switch K1, or the third intermediate switch M1. The rotation speed of the second motor 12 is adjusted by performing PWM control for the second output switch 71 or the third input switch K1. Here, when PWM control is performed for the third input switch K1, the currents supplied to the first motor 11 and the second motor 12 are adjusted, and the rotation speeds of the first motor 11 and the second motor 12 are adjusted.

When rotating the first motor 11 and the second motor 12 in the reverse direction, the rotation speeds of the first motor 11 and the second motor 12 are adjusted by performing PWM control for the first output switch 61, the second input switch 70, or the third intermediate switch M1.

When rotating the first motor 11 and the second motor 12 in the reverse direction, the first output switch 61, the second input switch 70, and the third intermediate switch M1 are switched on, and the first motor 11 and the second motor 12 are connected in series. In other cases, for both the first motor 11 and the second motor 12, one end and the other end are connected to the input end 20*a* and the output end 20*b*, respectively. Accordingly, the current flowing through the first motor 11 when rotating the first motor 11 and the second motor 12 in the reverse direction is smaller than the current flowing through the first motor 11 in other cases. The current flowing through the second motor 12 when rotating the first motor 11 and the second motor 12 in the reverse direction is smaller than the current flowing through the second motor 12 in other cases.

Accordingly, the duty cycle of the PWM control when rotating the first motor 11 and the second motor 12 in the reverse direction is set to a higher value than the duty cycle of the PWM control when rotating only the first motor 11 or only the second motor 12. This makes it possible to adjust the rotation speeds of the first motor 11 and the second motor 12 when rotating the first motor 11 and the second motor 12 in the reverse direction to the same speeds as the rotation speeds of the first motor 11 and the second motor 12 in other cases.

The microcomputer 21 outputs a PWM signal, which repeatedly switches between the high-level voltage and the low-level voltage in an alternating manner, to the drive circuit that drives the PWM switch. PWM control is performed as a result. In the PWM signal, switching to the high-level voltage or the low-level voltage is performed cyclically. The percentage of a period at the high-level voltage in a single cycle period corresponds to the duty cycle of the PWM control.

Normally, for a drive circuit that switches a switch on or off based on an input voltage and current information, there is a long period from when the input voltage switches to the high-level voltage or the low-level voltage to when the switch switches on or off. Accordingly, it is preferable that the PWM switch be a switch that is switched on or off by the drive circuit based only on the input voltage, i.e., the first output switch 61, the second output switch 71, the third intermediate switch M1, or the third output switch N1.

Configuration of Microcomputer 21

Figure 5:
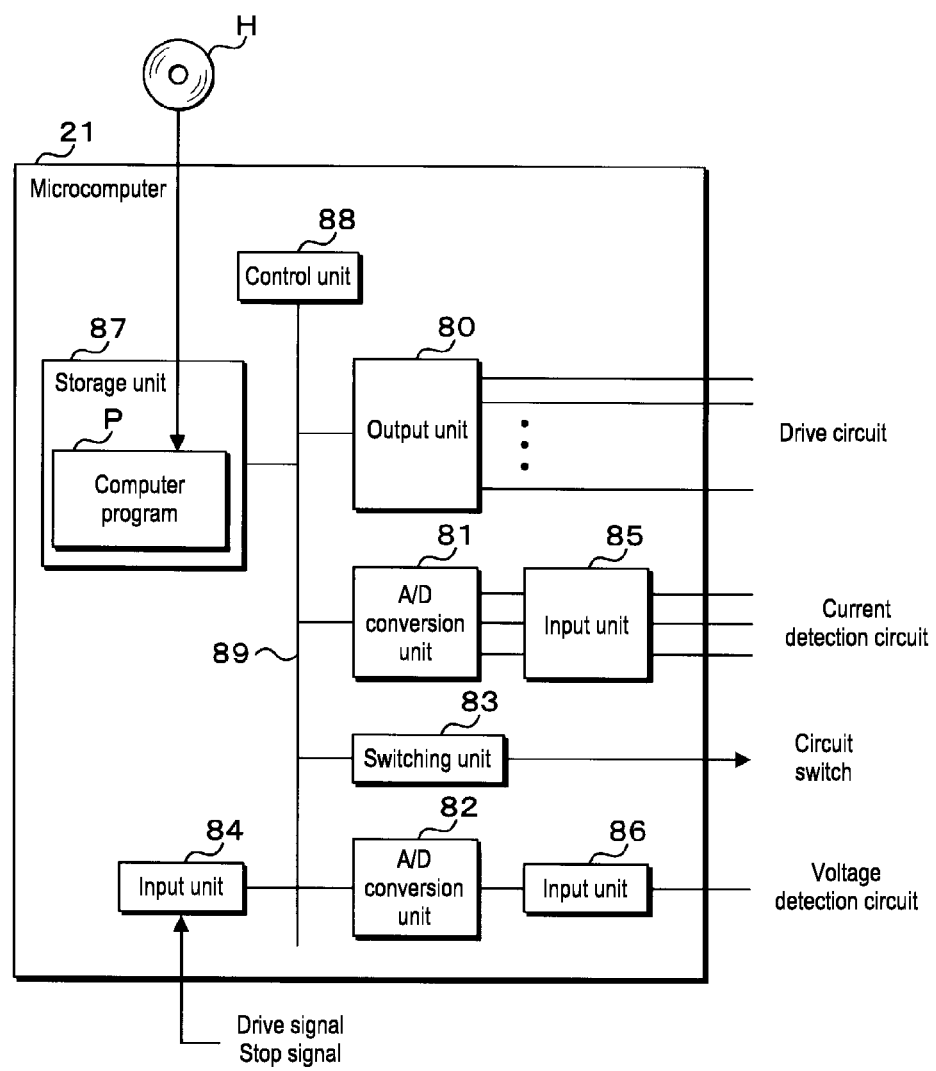
FIG. 5 is a block diagram illustrating the primary configuration of a microcomputer.

FIG. 5 is a block diagram illustrating the primary configuration of the microcomputer 21. The microcomputer 21 includes an output unit 80, A/D conversion units 81 and 82, a switching unit 83, input units 84, 85, and 86, a storage unit 87, and a control unit 88. The output unit 80, the A/D conversion units 81 and 82, the switching unit 83, the input unit 84, the storage unit 87, and the control unit 88 are connected to an internal bus 89. The output unit 80 is further connected to the drive circuits 40, 41, 50, 51, D, E, and F, respectively, of the switch circuit 20.

The A/D conversion unit 81 is further connected to the input unit 85. The input unit 85 is further connected to the current detection circuits 42, 52, and G, respectively, of the switch circuit 20. The A/D conversion unit 82 is further connected to the input unit 86. The input unit 86 is further connected to the voltage detection circuit 23.

The output unit 80 switches the input voltages of the drive circuits 40, 41, 50, 51, D, E, and F to the high-level voltage or the low-level voltage in response to instructions from the control unit 88. Furthermore, the output unit 80 outputs PWM signals to the drive circuits 40, 41, 50, 51, D, E, and F in response to instructions from the control unit 88. The duty cycles of the PWM signals output to the drive circuits 40, 41, 50, 51, D, E, and F are set individually. The control unit 88 may change these duty cycles.

Each of the current detection circuits 42, 52, and G outputs analog current information to the input unit 85. When analog current information from the current detection circuits 42, 52, and G is input, the input unit 85 outputs the input analog current information to the A/D conversion unit 81. The A/D conversion unit 81 converts the analog current information input from the input unit 85 into digital current information.

The control unit 88 obtains the digital current information converted by the A/D conversion unit 81. When the control unit 88 obtains, from the A/D conversion unit 81, the current information output from one of the current detection circuits 42, 52, and G, the current indicated by the obtained current information substantially matches the current detected at the time of the obtainment.

The switching unit 83 switches the circuit switch 30 of the series circuit 22 on or off in response to an instruction from the control unit 88.

The voltage detection circuit 23 outputs analog voltage information indicating the node voltage to the input unit 86. If analog voltage information has been input, the input unit 86 outputs the input analog current information to the A/D conversion unit 82. The A/D conversion unit 82 converts the analog voltage information input from the input unit 86 into digital voltage information. The control unit 88 obtains the digital voltage information from the A/D conversion unit 82. The node voltage indicated by the voltage information obtained by the control unit 88 substantially matches the node voltage detected by the voltage detection circuit 23 at the time of the obtainment.

The drive signal and the stop signal are input to the input unit 84. When the drive signal is input, the input unit 84 notifies the control unit 88 of the content of the input drive signal, i.e., the motor to be driven and the rotation direction of the motor to be driven. When the stop signal is input, the input unit 84 notifies the control unit 88 of the input of the stop signal.

The storage unit 87 is non-volatile memory. A computer program P is stored in the storage unit 87. The control unit 88 includes a processing device that executes processing, e.g., a Central Processing Unit (CPUs), and functions as a processing unit. By executing the computer program P, the processing device of the control unit 88 executes short circuit detection processing, normal drive processing, first partial drive processing, second partial drive processing, and third partial drive processing.

The short circuit detection processing is processing for detecting a short circuit in a switch of the switch circuit 20. The normal drive processing is processing for driving one or both of the first motor 11 and the second motor 12, and is executed when all of the switches of the switch circuit 20 are normal. The first partial drive processing is processing for driving only the first motor 11, and is executed when both ends of the first output switch 61 or the third output switch N1 are shorted. The second partial drive processing is processing for driving only the second motor 12, and is executed when both ends of the second input switch 70, the second output switch 71, or the third input switch K1 are shorted. The third partial drive processing is processing for driving the first motor 11 or the second motor 12, and is executed when both ends of the third intermediate switch M1 are shorted.

Note that the computer program P may be stored in a storage medium H so as to be readable by the processing device of the control unit 88. In this case, the computer program P read out from the storage medium H by a readout device (not shown) is stored in the storage unit 87. The storage medium H is an optical disk, a flexible disk, a magnetic disk, a magneto-optical disk, semiconductor memory, or the like. The optical disk is a CD (Compact Disc)-ROM (Read Only Memory), DVD (Digital Versatile Disc)-ROM, a BD (Blu-ray) (registered trademark) Disc, or the like. The magnetic disk is a hard disk, for example. Additionally, the computer program P may be downloaded from an external device (not shown) connected to a communication network (not shown), and the downloaded computer program P may be stored in the storage unit 87.

The control unit 88 may include two or more of the processing devices. In this case, the plurality of processing devices may respectively execute the short circuit detection processing, the normal drive processing, the first partial drive processing, the second partial drive processing, and the third partial drive processing in parallel.

Short Circuit Detection Processing

FIG. 6 is a diagram illustrating the short circuit detection processing sequence. The control unit 88 executes the short circuit detection processing when the operations of the first motor 11 and the second motor 12 are stopped. A "short circuit detection condition" is a condition under which a short circuit is considered to have occurred. A "shorted switch" is a switch in which both ends are shorted. A "prohibited motor" is a motor for which driving is prohibited.

The storage unit 87 stores a set voltage threshold in advance. The voltage threshold is greater than zero V and no greater than a divided voltage obtained by the first resistor 31 and the second resistor 32 dividing the constant voltage Vc. It is also assumed that among the switches of the switch circuit 20, i.e., the first input switch 60, the first output switch 61, the second input switch 70, the second output switch 71, the third input switch K1, the third intermediate switch M1, and the third output switch N1, both ends of two or more of the switches will not be shorted.

The resistance value of each of the first resistor 31 and the second resistor 32 is sufficiently higher than a resistance component value of the first motor 11 and sufficiently higher than a resistance component value of the second motor 12. Additionally, the control unit 88 instructs the output unit 80 to switch each of the switches of the switch circuit 20 on or off. The output unit 80 switches the voltages output to the drive circuits 40, 41, 50, 51, D, E, and F to the high-level voltage or the low-level voltage in response to instructions from the control unit 88. As described above, the drive circuits 40, 41, 50, 51, D, E, and F switch the first input switch 60, the first output switch 61, the second input switch 70, the second output switch 71, the third input switch K1, the third intermediate switch M1, and the third output switch N1 on or off, respectively, based on the input voltages.

The control unit 88 first executes Sequence 1. In Sequence 1, the control unit 88 instructs the output unit 80 to switch all the switches of the switch circuit 20 off. Furthermore, the control unit 88 instructs the switching unit 83 to switch the circuit switch 30 of the series circuit 22 off. In this state, the control unit 88 obtains, from the A/D conversion unit 82, the voltage information indicating the node voltage at the resistor connection node.

Here, when all of the switches of the switch circuit 20 are normal, the node voltage is zero V, which is less than the voltage threshold. If both ends of the first input switch 60 are shorted, the node voltage substantially matches the power supply voltage of the DC power supply U, and is therefore at least the voltage threshold. Accordingly, when the node voltage indicated by the obtained voltage information is at least the voltage threshold, the control unit 88 detects a short circuit in the first input switch 60. Upon detecting a short circuit in the first input switch 60, the control unit 88 prohibits the driving of the first motor 11 and the second motor 12, and ends the short circuit detection processing.

If both ends of the first input switch 60 are shorted, current in the second direction (the left direction in FIG. 2) cannot flow through the first motor 11. Additionally, if the second input switch 70, the third intermediate switch M1, and the third output switch N1 are switched on to supply current in the second direction to the second motor 12, current in the first direction (the right direction in FIG. 2) is supplied to the first motor 11, and the first motor 11 rotates in the forward direction. The driving of the first motor 11 and the second motor 12 is prohibited for this reason.

If a short circuit is not detected in the first input switch 60, the control unit 88 executes Sequence 2. In Sequence 2, in a state where the output unit 80 is instructed to switch all the switches of the switch circuit 20 off, the control unit 88 instructs the switching unit 83 to switch the circuit switch 30 on. In this state, the control unit 88 obtains the voltage information from the A/D conversion unit 82.

Here, when all of the switches of the switch circuit 20 are normal, the node voltage is the divided voltage, which is at least the voltage threshold. If both ends of the first output switch 61 or the third output switch N1 are shorted, the node voltage is substantially zero V, which is less than the voltage threshold. Accordingly, when the node voltage indicated by the obtained voltage information is less than the voltage threshold, the control unit 88 detects a short circuit in the first output switch 61 or the third output switch N1. Upon detecting a short circuit in the first output switch 61 or the third output switch N1, the control unit 88 prohibits the driving of the first motor 11, and ends the short circuit detection processing.

If both ends of the first output switch 61 or the third output switch N1 are shorted, current in the first direction or the second direction cannot be supplied to the first motor 11, and thus the driving of the first motor 11 is prohibited.

When all of the switches of the switch circuit 20 are off and the circuit switch 30 is on, current flows through the circuit switch 30, the first resistor 31, and the second resistor 32 in that order. Accordingly, the resistor connection node between the first resistor 31 and the second resistor 32 is a connection node on a downstream side of the circuit switch 30.

Note that the circuit switch 30 may be connected between the first resistor 31 and the second resistor 32. In this case, the constant voltage Vc is applied to one end of the first resistor 31, and the resistor connection node is a connection node between the circuit switch 30 and the second resistor 32.

If a short circuit is not detected in the first output switch 61 or the third output switch N1 in Sequence 2, the control unit 88 executes Sequence 3. In Sequence 3, the control unit 88 instructs the output unit 80 to switch only the third intermediate switch M1, among the switches of the switch circuit 20, on. Because only the third intermediate switch M1 is instructed to switch on, the switches of the switch circuit 20 aside from the third intermediate switch M1 are instructed to switch off.

Furthermore, the control unit 88 instructs the switching unit 83 to switch the circuit switch 30 off. In this state, the control unit 88 obtains the voltage information from the A/D conversion unit 82.

Here, when all of the switches of the switch circuit 20 are normal, the node voltage is zero V, which is less than the voltage threshold. If both ends of the second input switch 70 or the third input switch K1 are shorted, the node voltage substantially matches the power supply voltage of the DC power supply U, and is therefore at least the voltage threshold. Accordingly, when the node voltage indicated by the obtained voltage information is at least the voltage threshold, the control unit 88 detects a short circuit in the second input switch 70 or the third input switch K1. Upon detecting a short circuit in the second input switch 70 or the third input switch K1, the control unit 88 prohibits the driving of the second motor 12, and ends the short circuit detection processing.

If both ends of the second input switch 70 or the third input switch K1 are shorted, current in the second direction or the first direction cannot be supplied to the second motor 12, and thus the driving of the second motor 12 is prohibited.

If a short circuit is not detected in the second input switch 70 or the third input switch K1, the control unit 88 executes Sequence 4. In Sequence 4, in a state where the control unit 88 instructs the output unit 80 to switch only the third intermediate switch M1, among the switches of the switch circuit 20, on, the control unit 88 instructs the switching unit 83 to switch the circuit switch 30 on. In this state, the control unit 88 obtains the voltage information from the A/D conversion unit 82.

Here, when all of the switches of the switch circuit 20 are normal, the node voltage is the divided voltage, which is at least the voltage threshold. If both ends of the second output switch 71 are shorted, the node voltage is substantially zero V, which is less than the voltage threshold. Accordingly, when the node voltage indicated by the obtained voltage information is less than the voltage threshold, the control unit 88 detects a short circuit in the second output switch 71. Upon detecting a short circuit in the second output switch 71, the control unit 88 prohibits the driving of the second motor 12, and ends the short circuit detection processing.

If both ends of the second output switch 71 are shorted, current in the second direction cannot be supplied to the second motor 12, and thus the driving of the second motor 12 is prohibited.

If a short circuit is not detected in the second output switch 71, the control unit 88 executes Sequence 5. In Sequence 5, the control unit 88 instructs the output unit 80 to switch only the third input switch K1 on. Because only the third input switch K1 is instructed to switch on, the switches aside from the third input switch K1, among the switches of the switch circuit 20, are instructed to switch off. Furthermore, the control unit 88 instructs the switching unit 83 to switch the circuit switch 30 off.

In this state, the control unit 88 obtains the voltage information from the A/D conversion unit 82.

Here, when all of the switches of the switch circuit 20 are normal, the node voltage is zero V, which is less than the voltage threshold. If both ends of the third intermediate switch M1 are shorted, the node voltage substantially matches the power supply voltage of the DC power supply U, and is therefore at least the voltage threshold. When the node voltage indicated by the obtained voltage information is at least the voltage threshold, the control unit 88 detects a short circuit in the third intermediate switch M1, and prohibits the driving of the first motor 11 or the second motor 12.

If both ends of the third intermediate switch M1 are shorted, current in the first direction or the second direction cannot be supplied to both the first motor 11 and the second motor 12. When one of the first motor 11 or the second motor 12 is rotating, the rotation direction of the other motor is limited to one of the forward direction and the reverse direction. Prohibiting the driving of the first motor 11 or the second motor 12 means that when one of the first motor 11 and the second motor 12 is being driven, the driving of the other motor is prohibited.

After executing Sequence 5, the control unit 88 ends the short circuit detection processing. After executing the short circuit detection processing, the control unit 88 executes the normal drive processing, the first partial drive processing, the second partial drive processing, or the third partial drive processing.

Note that in Sequence 5, rather than instructing the output unit 80 to switch only the third input switch K1 on, the control unit 88 may instruct the output unit 80 to switch only the second input switch 70 on, or switch both the third input switch K1 and the second input switch 70 on.

Normal Drive Processing

Figure 7:
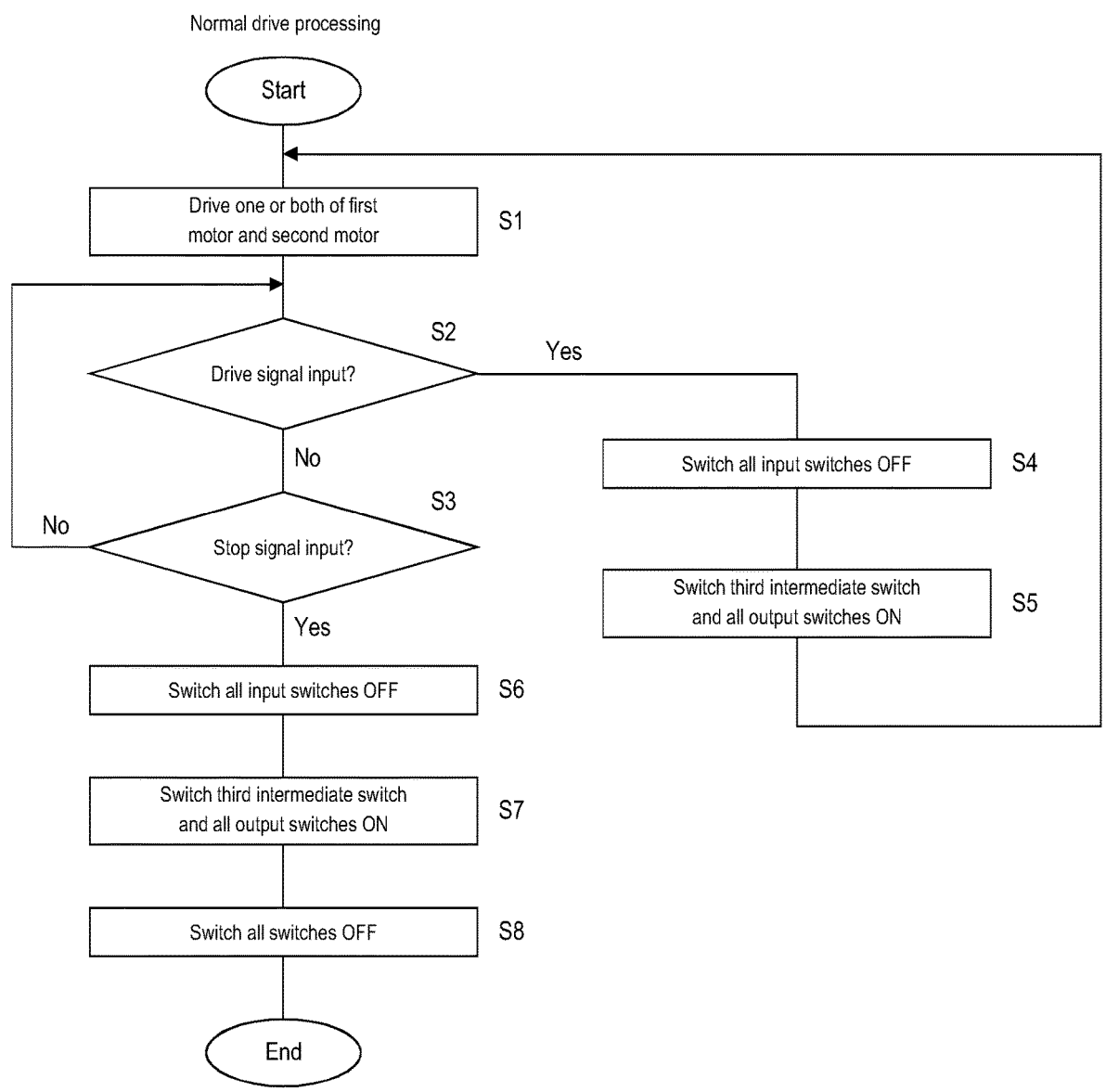
FIG. 7 is a flowchart illustrating a normal drive processing sequence.

FIG. 7 is a flowchart illustrating the normal drive processing sequence. The control unit 88 executes the normal drive processing when all the switches of the switch circuit 20 are normal and a drive signal is input to the input unit 84. In the normal drive processing, first, the control unit 88 causes the switch circuit 20 to drive one or both of the first motor 11 and the second motor 12 in accordance with the content of the drive signal input to the input unit 84 (step S1).

Specifically, the control unit 88 instructs the output unit 80 to individually switch the switches of the switch circuit 20 on or off. The output unit 80 switches the switches of the switch circuit 20 on or off in accordance with the content of the drive signal input to the input unit 84. The output unit 80 outputs a PWM signal to the drive circuit that switches the PWM switch on or off, and performs PWM control of the PWM switch.

If the drive signal input to the input unit 84 indicates the first motor 11 as the driving motor and indicates the forward direction as the rotation direction of the first motor 11, the output unit 80 switches the first input switch 60 and the third output switch N1 on and the other switches off, as illustrated in FIG. 3. Current in the first direction is supplied to the first motor 11 as a result. Furthermore, the output unit 80 outputs the PWM signal to one of the drive circuits 40 and F. As a result, PWM control is performed for the first input switch 60 or the third output switch N1, and the rotation speed of the first motor 11 is adjusted.

After executing step S1, the control unit 88 determines whether a drive signal has been input to the input unit 84 (step S2). If it is determined that a drive signal has not been input (S2: NO), the control unit 88 determines whether a stop signal has been input to the input unit 84 (step S3). If it is determined that a stop signal has not been input (S3: NO), the control unit 88 executes step S2 again, and stands by until a drive signal or a stop signal is input to the input unit 84.

If it is determined that a drive signal has been input (S2: YES), the control unit 88 instructs the output unit 80 to switch all the input switches, i.e., the first input switch 60, the second input switch 70, and the third input switch K1, off (step S4). Through this, the supply of current to the first motor 11 and the second motor 12 is stopped, and the first motor 11 and the second motor 12 stop operating.

After executing step S4, the control unit 88 instructs the output unit 80 to switch the third intermediate switch M1 and all the output switches on (step S5). "All the output switches" refers to the first output switch 61, the second output switch 71, and the third output switch N1. If one or both of the first motor 11 and the second motor 12 are being driven, current is supplied to the first motor 11 or the second motor 12, and energy is stored in the coil of the first motor 11 or the second motor 12. If the third intermediate switch M1 and all of the output switches are on, the coil of the first motor 11 or the second motor 12 outputs current and releases energy.

After executing step S5, the control unit 88 executes step S1, causing the switch circuit 20 to drive one or both of the first motor 11 and the second motor 12 in accordance with the content of the drive signal newly input to the input unit 84.

If it is determined that a stop signal has been input (S3: YES), as in step S4, the control unit 88 instructs the output unit 80 to switch all the input switches off (step S6). The first motor 11 and the second motor 12 stop operating as a result. After executing step S6, as in step S5, the control unit 88 instructs the output unit 80 to switch the third intermediate switch M1 and all the output switches on (step S7). The coil of the first motor 11 or the second motor 12 releases energy as a result.

After executing step S7, the control unit 88 instructs the output unit 80 to switch all the switches of the switch circuit 20 off (step S8), and ends the normal drive processing.

First Partial Drive Processing

Figure 8:
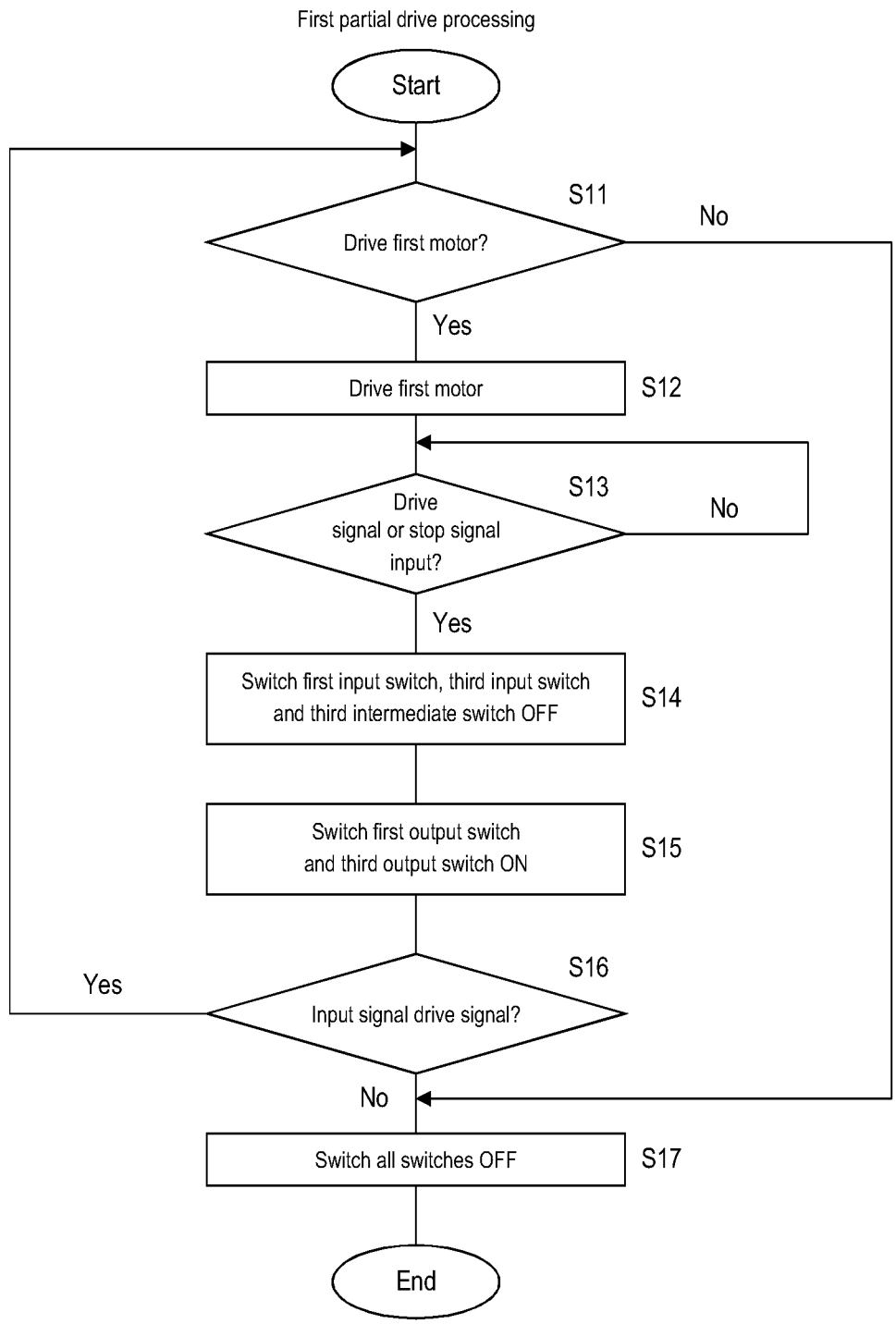
FIG. 8 is a flowchart illustrating a first partial drive processing sequence.

FIG. 8 is a flowchart illustrating the first partial drive processing sequence. The control unit 88 executes the first partial drive processing when the prohibited motor is the second motor 12 and a drive signal is input to the input unit 84. In the first partial drive processing, first, the control unit 88 determines whether to drive the first motor 11 based on the drive signal input to the input unit 84 (step S11). In step S11, the control unit 88 determines to drive the first motor 11 if the first motor 11 is included in the driving motors indicated by the drive signal. If the drive signal indicates only the second motor 12 as the driving motor, the control unit 88 determines not to drive the first motor 11.

If it is determined that the first motor 11 is to be driven (S11: YES), the control unit 88 drives the first motor 11 according to the content of the drive signal input to the input unit 84 (step S12). Specifically, the control unit 88 drives the first motor 11 by instructing the output unit 80 to switch the first input switch 60, the first output switch 61, the third input switch K1, the third intermediate switch M1, and the third output switch N1 on or off individually. The control unit 88 instructs the output unit 80 to output a PWM signal to the drive circuit that switches the PWM switch on or off. PWM control is performed for the PWM switch as a result. The driving of the second motor 12 is prohibited, and thus the second motor 12 is not driven in the first partial drive processing.

If the drive signal input to the input unit 84 indicates the forward direction as the rotation direction of the first motor 11, the output unit 80 switches the first input switch 60 and the third output switch N1 on and the other switches off, as illustrated in FIG. 3. Current in the first direction is supplied to the first motor 11 as a result. Furthermore, the output unit 80 outputs the PWM signal to one of the drive circuits 40 and F. As a result, PWM control is performed for the first input switch 60 or the third output switch N1, and the rotation speed of the first motor 11 is adjusted. A different switch from the shorted switch is selected as the PWM switch.

After executing step S12, the control unit 88 determines whether a drive signal or a stop signal has been input to the input unit 84 (step S13). If it is determined that a drive signal or a stop signal has not been input to the input unit 84 (S13: NO), the control unit 88 executes step S13 again, and stands by until a drive signal or a stop signal is input to the input unit 84.

If it is determined that a drive signal or a stop signal has been input (S13: YES), the control unit 88 instructs the output unit 80 to switch the first input switch 60, the third input switch K1, and the third intermediate switch M1 off (step S14). The supply of current to the first motor 11 is stopped, and the first motor 11 stops operating, as a result. Both ends of the third input switch K1 may be shorted at the point in time when step S14 is executed. In this case, the output unit 80 cannot switch the third input switch K1 off. However, the third intermediate switch M1 switches off, and thus the first motor 11 stops operating.

After executing step S14, the control unit 88 instructs the output unit 80 to switch the first output switch 61 and the third output switch N1 on (step S15). The coil of the first motor 11 releases energy as a result. After executing step S15, the control unit 88 determines whether the input signal input to the input unit 84 is a drive signal (step S16). If it is determined that the input signal is a drive signal (S16: YES), the control unit 88 executes step S11. If the driving motors indicated by the drive signal newly input to the input unit 84 include the first motor 11, the switch circuit 20 is caused to drive the first motor 11 according to the content of the newly-input drive signal.

If it is determined that the first motor 11 is not to be driven (S11: NO), or if it is determined that the input signal is not a drive signal (S16: NO), the control unit 88 instructs the output unit 80 to switch all the switches of the switch circuit 20 off (step S17), and ends the first partial drive processing. If step S17 is executed, the switches among the switches of the switch circuit 20, aside from the shorted switch, switch off.

Second Partial Drive Processing

Figure 9:
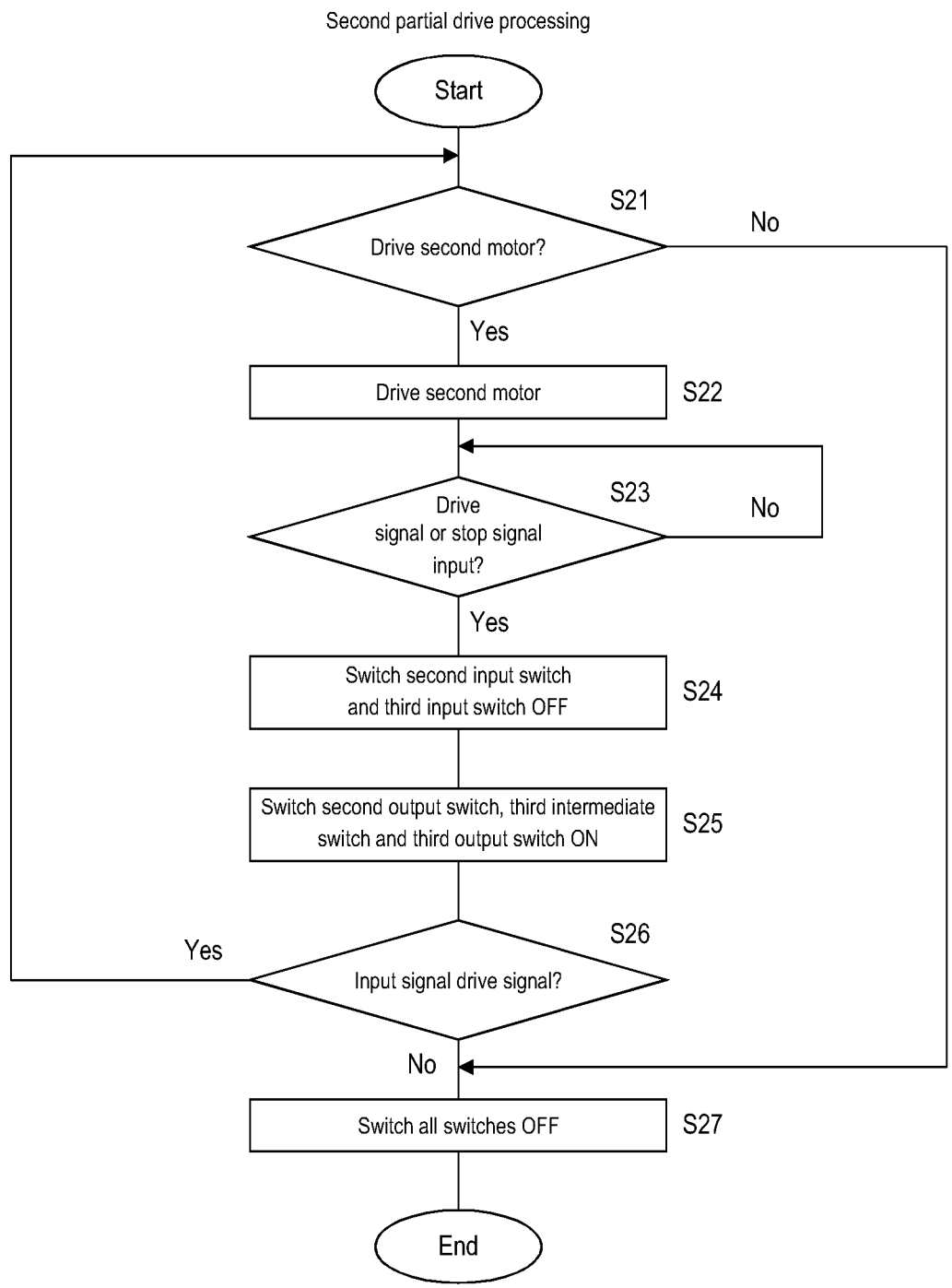
FIG. 9 is a flowchart illustrating a second partial drive processing sequence.

FIG. 9 is a flowchart illustrating the second partial drive processing sequence. The control unit 88 executes the second partial drive processing when the prohibited motor is the first motor 11 and a drive signal is input to the input unit 84. In the second partial drive processing, first, the control unit 88 determines whether to drive the second motor 12 based on the drive signal input to the input unit 84 (step S21). In step S21, the control unit 88 determines to drive the second motor 12 if the second motor 12 is included in the driving motors indicated by the drive signal. If the drive signal indicates only the first motor 11 as the driving motor, the control unit 88 determines not to drive the second motor 12.

If it is determined that the second motor 12 is to be driven (S21: YES), the control unit 88 drives the second motor 12 according to the content of the drive signal input to the input unit 84 (step S22). Specifically, the control unit 88 drives the second motor 12 by instructing the output unit 80 to switch the second input switch 70, the second output switch 71, the third input switch K1, the third intermediate switch M1, and the third output switch N1 on or off individually. The control unit 88 instructs the output unit 80 to output a PWM signal to the drive circuit that switches the PWM switch on or off. PWM control is performed for the PWM switch as a result. The driving of the first motor 11 is prohibited, and thus the first motor 11 is not driven in the second partial drive processing.

If the drive signal input to the input unit 84 indicates the forward direction as the rotation direction of the second motor 12, the output unit 80 switches the third input switch K1 and the second output switch 71 on and the other switches off, as illustrated in FIG. 3. Current in the first direction is supplied to the second motor 12 as a result. Furthermore, the output unit 80 outputs the PWM signal to one of the drive circuits D and 51. As a result, PWM control is performed for the third input switch K1 or the second output switch 71, and the rotation speed of the second motor 12 is adjusted. A different switch from the shorted switch is selected as the PWM switch.

After executing step S22, the control unit 88 determines whether a drive signal or a stop signal has been input to the input unit 84 (step S23). If it is determined that a drive signal or a stop signal has not been input to the input unit 84 (S23: NO), the control unit 88 executes step S23 again, and stands by until a drive signal or a stop signal is input to the input unit 84.

If it is determined that a drive signal or a stop signal has been input (S23: YES), the control unit 88 instructs the output unit 80 to switch the second input switch 70 and the third input switch K1 off (step S24). The supply of current to the second motor 12 is stopped, and the second motor 12 stops operating, as a result.

After executing step S24, the control unit 88 instructs the output unit 80 to switch the second output switch 71, the third intermediate switch M1, and the third output switch N1 on (step S25). The coil of the second motor 12 releases energy as a result. Both ends of the third output switch N1 may be shorted at the point in time when step S25 is executed. Even in such a case, the third output switch N1 is shorted, and thus the coil of the second motor 12 releases energy.

After executing step S25, the control unit 88 determines whether the input signal input to the input unit 84 is a drive signal (step S26). If it is determined that the input signal is a drive signal (S26: YES), the control unit 88 executes step S21. If the driving motors indicated by the drive signal newly input to the input unit 84 include the second motor 12, the switch circuit 20 is caused to drive the second motor 12 according to the content of the newly-input drive signal.

If it is determined that the second motor 12 is not to be driven (S21: NO), or if it is determined that the input signal is not a drive signal (S26: NO), the control unit 88 instructs the output unit 80 to switch all the switches of the switch circuit 20 off (step S27), and ends the second partial drive processing. If step S27 is executed, the switches among the switches of the switch circuit 20, aside from the shorted switch, switch off.

Third Partial Drive Processing

Figure 10:
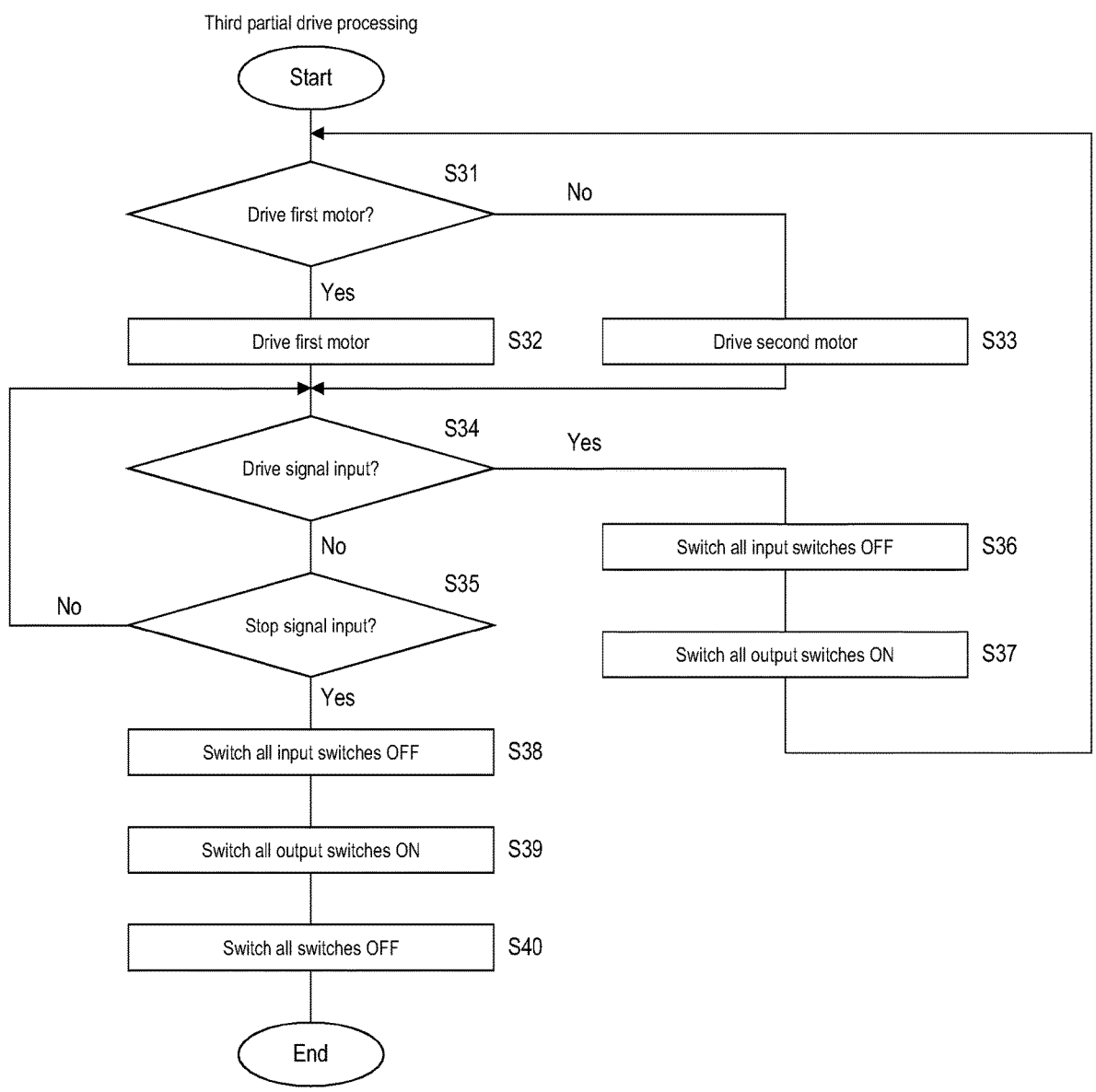
FIG. 10 is a flowchart illustrating a third partial drive processing sequence.

FIG. 10 is a flowchart illustrating the third partial drive processing sequence. The control unit 88 executes the third partial drive processing when the prohibited motor is the first motor 11 or the second motor 12, i.e., a short circuit in the third intermediate switch M1 has been detected, and a drive signal is input to the input unit 84. In the third partial drive processing, first, the control unit 88 determines whether to drive the first motor 11 based on the drive signal input to the input unit 84 (step S31), as in step S11 of the first partial drive processing.

If it is determined that the first motor 11 is to be driven (S31: YES), the control unit 88 drives the first motor 11 according to the content of the drive signal input to the input unit 84 (step S32), as in step S12 of the first partial drive processing. If it is determined that the first motor 11 is not to be driven (S31: NO), the control unit 88 drives the second motor 12 according to the content of the drive signal input to the input unit 84 (step S33), as in step S22 of the second partial drive processing.

After executing one of steps S32 and S33, the control unit 88 determines whether a drive signal has been input to the input unit 84 (step S34). If it is determined that a drive signal has not been input (S34: NO), the control unit 88 determines whether a stop signal has been input to the input unit 84 (step S35). If it is determined that a stop signal has not been input (S35: NO), the control unit 88 executes step S34 again, and stands by until a drive signal or a stop signal is input to the input unit 84.

If it is determined that a drive signal has been input (S34: YES), the control unit 88 instructs the output unit 80 to switch all the input switches off (step S36). Through this, the supply of current to the first motor 11 and the second motor 12 is stopped, and the first motor 11 and the second motor 12 stop operating.

After executing step S36, the control unit 88 instructs the output unit 80 to switch all the output switches on (step S37). If all of the output switches are on, since both ends of the third intermediate switch M1 are shorted, the coil of the first motor 11 or the second motor 12 outputs current and releases energy.

After executing step S37, the control unit 88 executes step S31 again, and determines whether to drive the first motor 11 according to the content of the drive signal newly input to the input unit 84. Then, the first motor 11 or the second motor 12 is driven in accordance with the content of the newly-input drive signal.

If it is determined that a stop signal has been input (S35: YES), as in step S36, the control unit 88 instructs the output unit 80 to switch all the input switches off (step S38). The first motor 11 and the second motor 12 stop operating as a result. After executing step S38, as in step S37, the control unit 88 instructs the output unit 80 to switch all the output switches on (step S39). The coil of the first motor 11 or the second motor 12 releases energy as a result.

After executing step S39, the control unit 88 instructs the output unit 80 to switch all the switches of the switch circuit 20 off (step S40), and ends the third partial drive processing. If step S39 is executed, the switches among the switches of the switch circuit 20, aside from the shorted switch, switch off.

As described thus far, if both ends of the third intermediate switch M1 are shorted, the control unit 88 does not drive the second motor 12 when driving the first motor 11. The control unit 88 drives the second motor 12 when not driving the first motor 11. The control unit 88 prioritizes driving the first motor 11.

Effects of Drive Device 10 and Further Notes

When one end and the other end of the first motor 11 are each connected to a connection node between two normal switches, the drive device 10 can rotate the first motor 11 in the forward direction and the reverse direction. Likewise, when one end and the other end of the second motor 12 are each connected to a connection node between two normal switches, the drive device 10 can rotate the second motor 12 in the forward direction and the reverse direction. Even if both ends of one of the three switches of the third connection circuit C1 have shorted, the one end of the first motor 11 or the second motor 12 is connected to the connection node between the remaining two switches of the third connection circuit C1. Accordingly, even if both ends of one switch of the third connection circuit C1 have shorted, the first motor 11 or the second motor 12 can be rotated in the forward direction and the reverse direction.

While driving the first motor 11 or the second motor 12, the control unit 88 may detect a failure or an anomaly in the switch circuit 20 based on the current flowing through the first input switch 60, the second input switch 70, and the third input switch K1.

Second Embodiment

In the first embodiment, the control unit 88 prioritized driving the first motor 11 when both ends of the third intermediate switch M1 are shorted. However, the motor for which driving is prioritized is not limited to the first motor 11.

Points of the second embodiment that are different from the first embodiment will be described hereinafter. The rest of the configuration, aside from the points described below, is the same as in the first embodiment. As such, constituent elements that are the same as in the first embodiment will be given the same reference signs as in the first embodiment, and will not be described.

Third Partial Drive Processing

Figure 11:
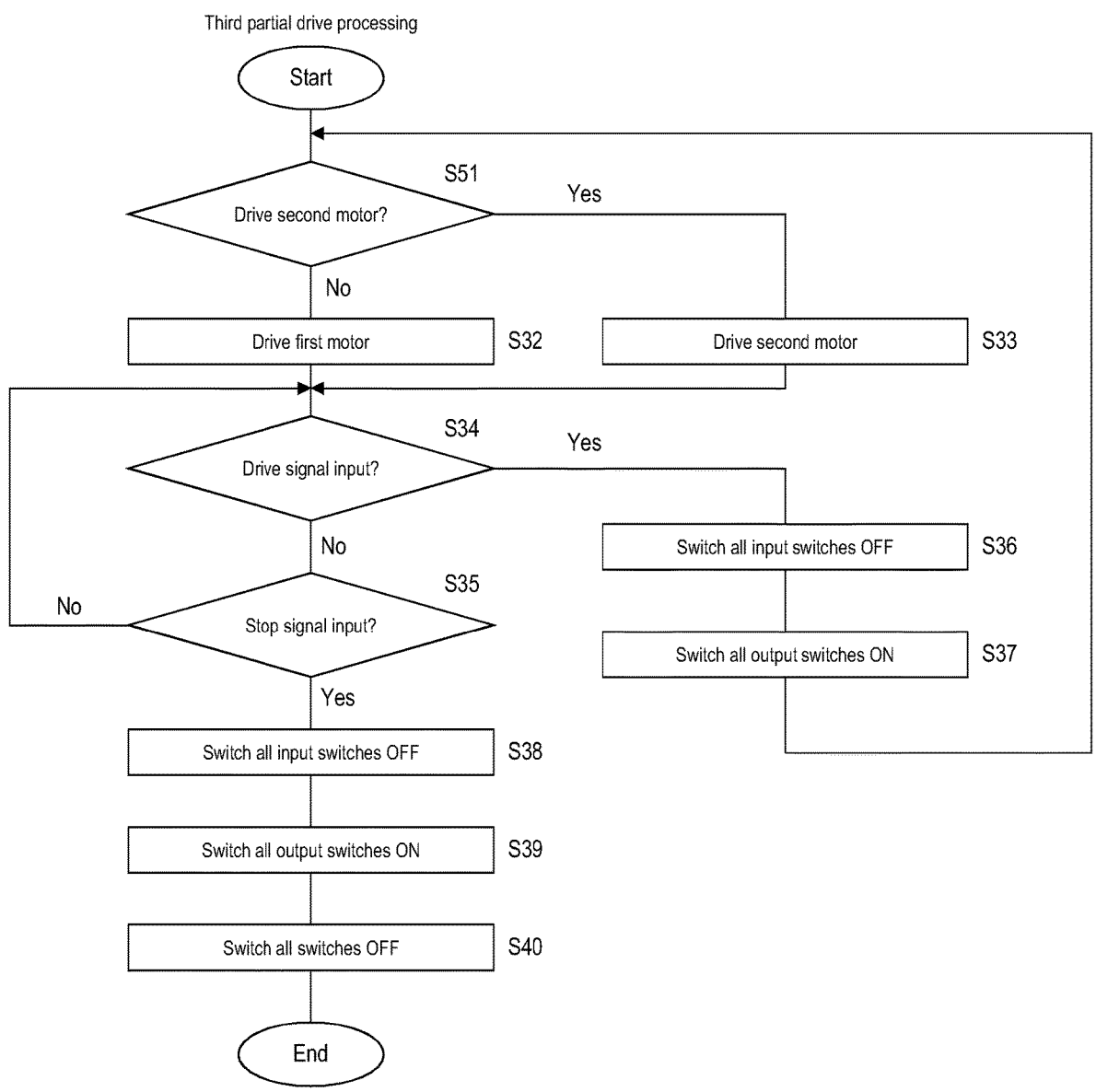
FIG. 11 is a flowchart illustrating a third partial drive processing sequence according to a second embodiment.

FIG. 11 is a flowchart illustrating a third partial drive processing sequence according to the second embodiment. The control unit 88 executes the third partial drive processing when the prohibited motor is the first motor 11 or the second motor 12, i.e., a short circuit in the third intermediate switch M1 has been detected, and a drive signal is input to the input unit 84. Much of the third partial drive processing in the second embodiment is the same as the third partial drive processing in the first embodiment. Accordingly, parts of the third partial drive processing in the second embodiment that are the same as in the third partial drive processing, i.e., steps S32 to S40, will not be described in detail.

In the third partial drive processing, first, the control unit 88 determines whether to drive the second motor 12 based on the drive signal input to the input unit 84 (step S51), as in step S21 of the second partial drive processing. If it is determined that the second motor 12 is not to be driven (S51: NO), the control unit 88 executes step S32. If it is determined that the second motor 12 is to be driven (S51: YES), the control unit 88 executes step S33. After executing step S37, the control unit 88 executes step S51 again, and determines whether to drive the second motor 12 according to the content of the drive signal newly input to the input unit 84. Then, the first motor 11 or the second motor 12 is driven in accordance with the content of the newly-input drive signal.

As described thus far, if both ends of the third intermediate switch M1 are shorted, the control unit 88 does not drive the first motor 11 when driving the second motor 12. The control unit 88 drives the first motor 11 when not driving the second motor 12. The control unit 88 prioritizes driving the second motor 12.

Effects of Drive Device 10

The drive device 10 according to the second embodiment provides the same effects as the drive device 10 according to the first embodiment, aside from the effects obtained by prioritizing the driving of the first motor 11 in the third partial drive processing.

Third Embodiment

In the first embodiment, the number of motors driven by the drive device 10 was two. However, the number of motors driven by the drive device 10 may be three or more.

Points of a third embodiment that are different from the first embodiment will be described hereinafter. The rest of the configuration, aside from the points described below, is the same as in the first embodiment. As such, constituent elements that are the same as in the first embodiment will be given the same reference signs as in the first embodiment, and will not be described.

Configuration of Switch Circuit 20

Figure 12:
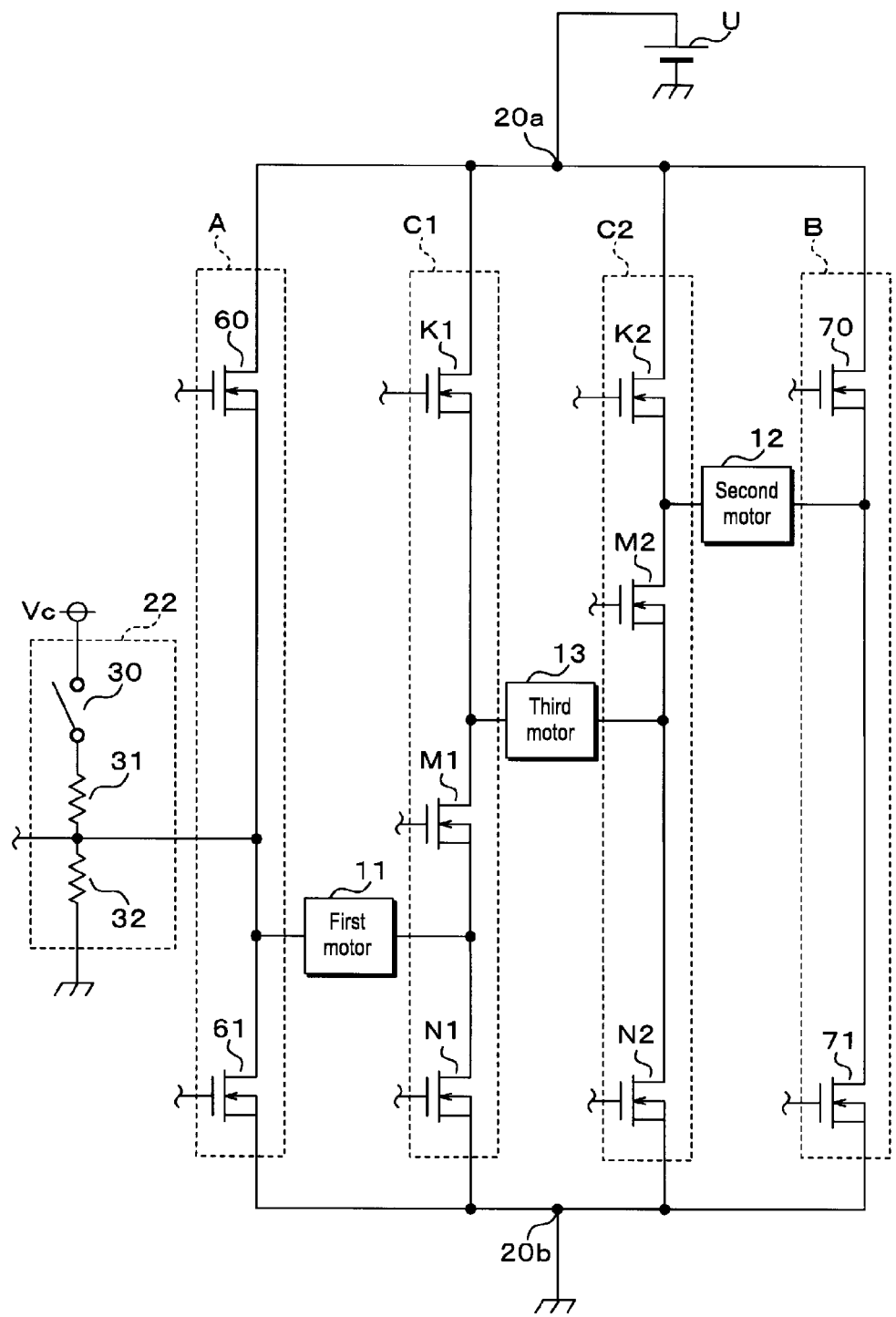
FIG. 12 is a circuit diagram illustrating the configuration of a switch circuit according to a third embodiment.

FIG. 12 is a circuit diagram illustrating the configuration of the switch circuit 20 according to the third embodiment. The power supply system 1 according to the third embodiment includes the drive device 10, the first motor 11, the second motor 12, a third motor 13, and the DC power supply U. The drive device 10 according to the third embodiment drives the first motor 11, the second motor 12, and the third motor 13. The switch circuit 20 according to the third embodiment is connected to one end and another end of the third motor 13, in addition to the first motor 11 and the second motor 12. The third motor 13 is configured in the same manner as the first motor 11 or the second motor 12. When current flows through the third motor 13 in the first direction (the right direction in FIG. 12), the third motor 13 rotates in the forward direction, in the same manner as the first motor 11 or the second motor 12. When current flows through the third motor 13 in the second direction (the left direction in FIG. 12), the third motor 13 rotates in the reverse direction, in the same manner as the first motor 11 or the second motor 12. When the supply of current to the third motor 13 stops, the third motor 13 stops rotating. The forward direction may be clockwise or counterclockwise.

The switch circuit 20 according to the third embodiment has all of the constituent elements of the switch circuit 20 according to the first embodiment. The switch circuit 20 according to the third embodiment further includes a third connection circuit C2. The first connection circuit A, the second connection circuit B, the third connection circuit C1, and the third connection circuit C2 are connected individually between the input end 20a and the output end 20b.

The third connection circuit C2 includes a third input switch K2, a third intermediate switch M2, and a third output switch N2. These are N-channel FETs. In the third connection circuit C2, the third input switch K2, the third intermediate switch M2, and the third output switch N2 are connected in series. Specifically, the source of the third input switch K2 is connected to the drain of the third intermediate switch M2. The source of the third intermediate switch M2 is connected to the drain of the third output switch N2.

The drain of the third input switch K2 is connected to the input end 20a. The source of the third output switch N2 is connected to the output end 20b. The first motor 11 is connected in the same manner as in the first embodiment. The second motor 12 is connected between the second connection node of the second connection circuit B, and a connection node between the third input switch K2 and the third intermediate switch M2. The third motor 13 is connected between the connection node between the third input switch K1 and the third intermediate switch M1, and the connection node between the third intermediate switch M2 and the third output switch N2.

Each of the third input switch K2, the third intermediate switch M2, and the third output switch N2 functions in the same manner as the first input switch 60. The reference voltage of each of the first input switch 60, the first output switch 61, the second input switch 70, the second output switch 71, the third input switches K1 and K2, the third intermediate switches M1 and M2, and the third output switches N1 and N2 may be different from the reference voltages of the other switches.

The switch circuit 20 according to the third embodiment further includes three drive circuits connected to the gates of the third input switch K2, the third intermediate switch M2, and the third output switch N2, and a current detection circuit that detects current flowing through the third input switch K2. The drive circuit and the current detection circuit are not shown in FIG. 12.

The three drive circuits are connected to the output unit 80 of the microcomputer 21 in the same manner as the drive circuits D, E, and F. The drive circuit connected to the third input switch K2 is connected to the current detection circuit that detects current flowing through the third input switch K2. Connection nodes between the drive circuits and the current detection circuit are connected to the input unit 85 of the microcomputer 21. Like the current detection circuit G, the current detection circuit outputs analog current information indicating the detected current to the drive circuit connected to the third input switch K2 and the input unit 85 of the microcomputer 21. Each of the three drive circuits switches the third input switch K2, the third intermediate switch M2, and the third output switch N2 on or off, in the same manner as the drive circuits D, E, and F.

The current detection circuit that detects current flowing through the third input switch K2 outputs analog current information to the input unit 85. When analog current information from the current detection circuit is input, the input unit 85 outputs the input analog current information to the A/D conversion unit 81. The A/D conversion unit 81 converts the analog current information input from the input unit 85 into digital current information. The control unit 88 obtains the digital current information converted by the A/D conversion unit 81. When the control unit 88 obtains, from the A/D conversion unit 81, the current information output from the current detection circuit, the current indicated by the obtained current information substantially matches the current detected at the time of the obtainment.

The resistance value of each of the first resistor 31 and the second resistor 32 is sufficiently higher than a resistance component value of the third motor 13. Additionally, as in the first embodiment, the control unit 88 instructs the output unit 80 to switch each of the switches of the switch circuit 20 on or off. In accordance with instructions from the control unit 88, the output unit 80 switches the voltages output to the three drive circuits connected to the third input switch K2, the third intermediate switch M2, and the third output switch N2, respectively, to a high-level voltage or a low-level voltage. The three drive circuits respectively switch the third input switch K2, the third intermediate switch M2, and the third output switch N2 on or off, based on the input voltages.

Short Circuit Detection Processing

FIG. 13 is a diagram illustrating the short circuit detection processing sequence. The control unit 88 executes the short circuit detection processing when the operations of the first motor 11, the second motor 12, and the third motor 13 are stopped, in the same manner as in the first embodiment.

The control unit 88 first executes Sequence 1. In Sequence 1, the control unit 88 obtains the voltage information indicating the node voltage of the resistor connection node in a state where the control unit 88 instructs the output unit 80 to switch all the switches of the switch circuit 20 off and the circuit switch 30 is off. When the node voltage indicated by the obtained voltage information is at least the voltage threshold, the control unit 88 detects a short circuit in the first input switch 60. Upon detecting a short circuit in the first input switch 60, the control unit 88 prohibits the driving of the first motor 11 and the third motor 13, and ends the short circuit detection processing.

If a short circuit is not detected in the first input switch 60, the control unit 88 executes Sequence 2. In Sequence 2, the control unit 88 obtains the voltage information in a state where the control unit 88 instructs the output unit 80 to switch all the switches of the switch circuit 20 off and the circuit switch 30 is on. When the node voltage indicated by the obtained voltage information is less than the voltage threshold, the control unit 88 detects a short circuit in the first output switch 61 or the third output switch N1. Upon detecting a short circuit in the first output switch 61 or the third output switch N1, the control unit 88 prohibits the driving of the first motor 11, and ends the short circuit detection processing.

If a short circuit is not detected in the first output switch 61 or the third output switch N1, the control unit 88 executes Sequence 3. In Sequence 3, the control unit 88 obtains the voltage information from the A/D conversion unit 82 in a state where the control unit 88 instructs the output unit 80 to switch only the third intermediate switch M1, among the switches of the switch circuit 20, on, and the circuit switch 30 is off. When the node voltage indicated by the obtained voltage information is at least the voltage threshold, the control unit 88 detects a short circuit in the third input switch K1. Upon detecting a short circuit in the third input switch K1, the control unit 88 prohibits the driving of the second motor 12 and the third motor 13, and ends the short circuit detection processing.

If a short circuit is not detected in the third input switch K1, the control unit 88 executes Sequence 4. In Sequence 4, the control unit 88 obtains the voltage information from the A/D conversion unit 82 in a state where the control unit 88 instructs the output unit 80 to switch only the third intermediate switch M1, among the switches of the switch circuit 20, off, and the circuit switch 30 is on. When the node voltage indicated by the obtained voltage information is less than the voltage threshold, the control unit 88 detects a short circuit in the third output switch N2. Upon detecting a short circuit in the third output switch N2, the control unit 88 prohibits the driving of the third motor 13, and ends the short circuit detection processing.

If a short circuit is not detected in the third output switch N2, the control unit 88 executes Sequence 5. In Sequence 5, the control unit 88 obtains the voltage information from the A/D conversion unit 82 in a state where the control unit 88 instructs the output unit 80 to switch only the third input switch K1 on and the circuit switch 30 is off. When the node voltage indicated by the obtained voltage information is at least the voltage threshold, the control unit 88 detects a short circuit in the third intermediate switch M1, and prohibits the driving of the first motor 11 or the third motor 13.

Note that in Sequence 5, rather than instructing the output unit 80 to switch only the third input switch K1 on, the control unit 88 may instruct the output unit 80 to switch only the third input switch K2 on, or switch both the third input switches K1 and K2 on.

If a short circuit is not detected in the third intermediate switch M1, the control unit 88 executes Sequence 6. In Sequence 6, the control unit 88 obtains the voltage information from the A/D conversion unit 82 in a state where the control unit 88 instructs the output unit 80 to switch only the third intermediate switches M1 and M2, among the switches of the switch circuit 20, on, and the circuit switch 30 is off. When the node voltage indicated by the obtained voltage information is at least the voltage threshold, the control unit 88 detects a short circuit in the second input switch 70 or the third input switch K2. Upon detecting a short circuit in the second input switch 70 or the third input switch K2, the control unit 88 prohibits the driving of the second motor 12, and ends the short circuit detection processing.

If a short circuit is not detected in the second input switch 70 or the third input switch K2, the control unit 88 executes Sequence 7. In Sequence 7, the control unit 88 obtains the voltage information from the A/D conversion unit 82 in a state where the control unit 88 instructs the output unit 80 to switch only the third intermediate switches M1 and M2, among the switches of the switch circuit 20, on, and the circuit switch 30 is on. When the node voltage indicated by the obtained voltage information is less than the voltage threshold, the control unit 88 detects a short circuit in the second output switch 71. Upon detecting a short circuit in the second output switch 71, the control unit 88 prohibits the driving of the second motor 12, and ends the short circuit detection processing.

If a short circuit is not detected in the second output switch 71, the control unit 88 executes Sequence 8. In Sequence 8, the control unit 88 obtains the voltage information from the A/D conversion unit 82 in a state where the control unit 88 instructs the output unit 80 to switch only the third input switch K2 and the third intermediate switch M1 on and the circuit switch 30 is off. When the node voltage indicated by the obtained voltage information is at least the voltage threshold, the control unit 88 detects a short circuit in the third intermediate switch M2, and prohibits the driving of the second motor 12 or the third motor 13.

Note that in Sequence 8, rather than instructing the output unit 80 to switch the third input switch K2 on, the control unit 88 may instruct the output unit 80 to switch the second input switch 70 on, or switch both the second input switch 70 and the third input switch K2 on.

Drive Processing

In the third embodiment too, the control unit 88 executes various drive processing by executing the computer program P. As in the first embodiment or the second embodiment, in this drive processing, the control unit 88 drives at least one of the first motor 11, the second motor 12, and the third motor 13 so as to satisfy the content indicated by the drive signal to the greatest extent possible, without driving a prohibited motor. If the prohibited motor is the first motor 11 or the third motor 13, or if the prohibited motor is the second motor 12 or the third motor 13, the driving of one motor is prioritized in the same manner as in the third partial drive processing of the first embodiment or the second embodiment.

The duty cycle of the PWM control when the first motor 11, the second motor 12, and the third motor 13 are rotated in the reverse direction is set to a value higher than the duty cycle of the PWM control when only the first motor 11, only the second motor 12, or only the third motor 13 is rotated.
Effects of Drive Device 10

Even if both ends of one of the six switches of the third connection circuits C1 and C2 have shorted, the one end of the first motor 11 or the second motor 12 is connected to the connection node between the two normal switches. Accordingly, even if both ends of one of the six switches of the third connection circuits C1 and C2 have shorted, the first motor 11 or the second motor 12 can be rotated in the forward direction and the reverse direction. The drive device 10 according to the third embodiment provides the same effects as those of the drive device 10 according to the first embodiment or the second embodiment.

Fourth Embodiment

In the third embodiment, the number of motors driven by the drive device 10 was three. However, the number of motors driven by the drive device 10 may be four or more.

Points of a fourth embodiment that are different from the third embodiment will be described hereinafter. The rest of the configuration, aside from the points described below, is the same as in the third embodiment. As such, constituent elements that are the same as in the third embodiment will be given the same reference signs as in the third embodiment, and will not be described.
Configuration of Switch Circuit 20

Figure 14:
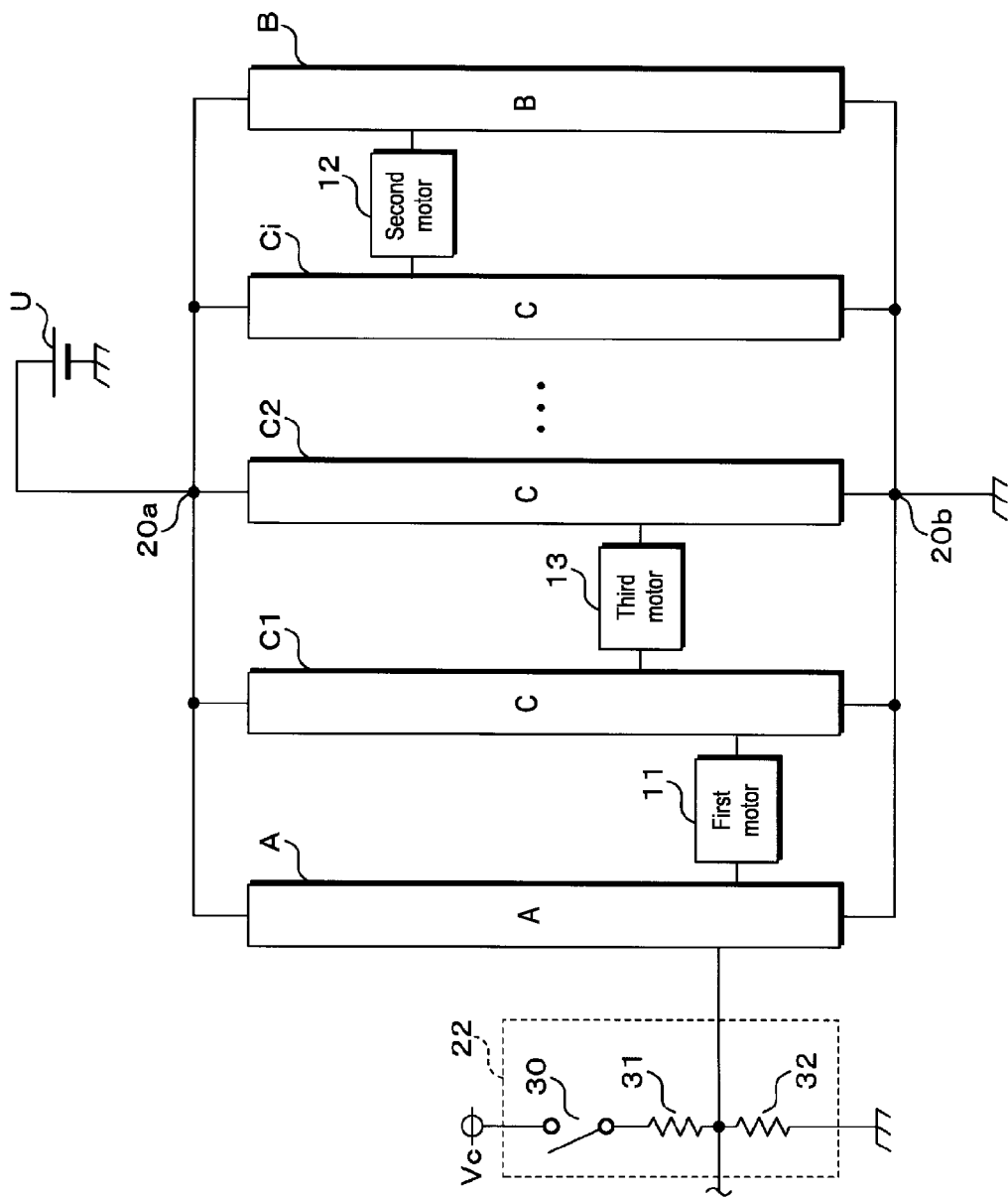
FIG. 14 is a circuit diagram illustrating the configuration of a switch circuit according to a fourth embodiment.

FIG. 14 is a circuit diagram illustrating the configuration of the switch circuit 20 according to the fourth embodiment. The power supply system 1 according to the fourth embodiment includes the drive device 10, the first motor 11, the second motor 12, a plurality of third motors 13, and the DC power supply U. The drive device 10 according to the fourth embodiment drives the plurality of third motors 13 in addition to the first motor 11 and the second motor 12. The switch circuit 20 according to the third embodiment is connected to one end and another end of each of the plurality of third motors 13, in addition to the first motor 11 and the second motor 12.

The switch circuit 20 includes the first connection circuit A, the second connection circuit B, and a plurality of third connection circuits C1, C2, . . . , Ci (i: an integer of 2 or higher). In a third connection circuit Cj (j=1, 2, . . . , i), a third input switch Kj, a third intermediate switch Mj, and a third output switch Nj are connected in series. The third input switch Kj, the third intermediate switch Mj, and the third output switch Nj are N-channel FETs. The first motor 11 is connected between the first connection circuit A and the third connection circuit C1, as in the third embodiment. The second motor 12 is connected between the second connection node of the second connection circuit B, and a connection node between a third input switch Ki and a third intermediate switch Mi.

The third motors 13 are connected between the third connection circuits Cx and Cx+1 (x=1, 2, . . . , i−1), as in the third embodiment. Accordingly, in each of the plurality of third connection circuits Cj, the number of motors connected to the connection node between the third input switch Kj and the third intermediate switch Mj is 1, and the number of motors connected to the connection node between the third intermediate switch Mj and the third output switch Nj is also 1. Each switch in the switch circuit 20 is switched on or off by a drive circuit, as in the third embodiment. The microcomputer 21 switches all of the switches of the switch circuit 20 on or off individually, as in the third embodiment.
Short Circuit Detection Processing Even with the drive device 10 configured as described above, the control unit 88 of the microcomputer 21 can detect a short circuit in all of the switches of the switch circuit 20 by switching the third intermediate switches of the third connection circuits C1, C2, . . . , Ci on in sequence, as in the third embodiment.
Drive Processing In the fourth embodiment too, the control unit 88 executes various drive processing by executing the computer program P. As in the third embodiment, in this drive processing, the control unit 88 drives at least one of the first motor 11, the second motor 12, and the plurality of third motors 13 so as to satisfy the content indicated by the drive signal to the greatest extent possible, without driving a prohibited motor. If the prohibited motor is one of two motors, e.g., the first motor 11 or the third motors 13, one of the motors is driven with priority, as in the third partial drive processing of the first embodiment or the second embodiment.

The duty cycles of the PWM control when rotating the first motor 11, the second motor 12, and all the third motors 13 in the reverse direction are set to higher values than the duty cycle of the PWM control when rotating only the first motor 11, only the second motor 12, or only one of the third motors 13.
Effects of Drive Device 10

Even if both ends of one of the switches of the third connection circuits C1, C2, . . . , Ci have shorted, the one end of the first motor 11 or the second motor 12 is connected to the connection node between the two normal switches. Accordingly, even if both ends of one of the switches of the third connection circuits C1, C2, . . . , Ci have shorted, the first motor 11 or the second motor 12 can be rotated in the forward direction and the reverse direction. The drive device 10 according to the fourth embodiment provides the same effects as those provided by the drive device 10 according to the third embodiment.

Fifth Embodiment

In the first embodiment, the resistor connection node in the series circuit 22 is located on the downstream side of the circuit switch 30. However, the resistor connection node may be on the upstream side of the circuit switch 30.

Points of a fifth embodiment that are different from the first embodiment will be described hereinafter. The rest of the configuration, aside from the points described below, is the same as in the first embodiment. As such, constituent elements that are the same as in the first embodiment will be given the same reference signs as in the first embodiment, and will not be described.
Configuration of Series Circuit 22

Figure 15:
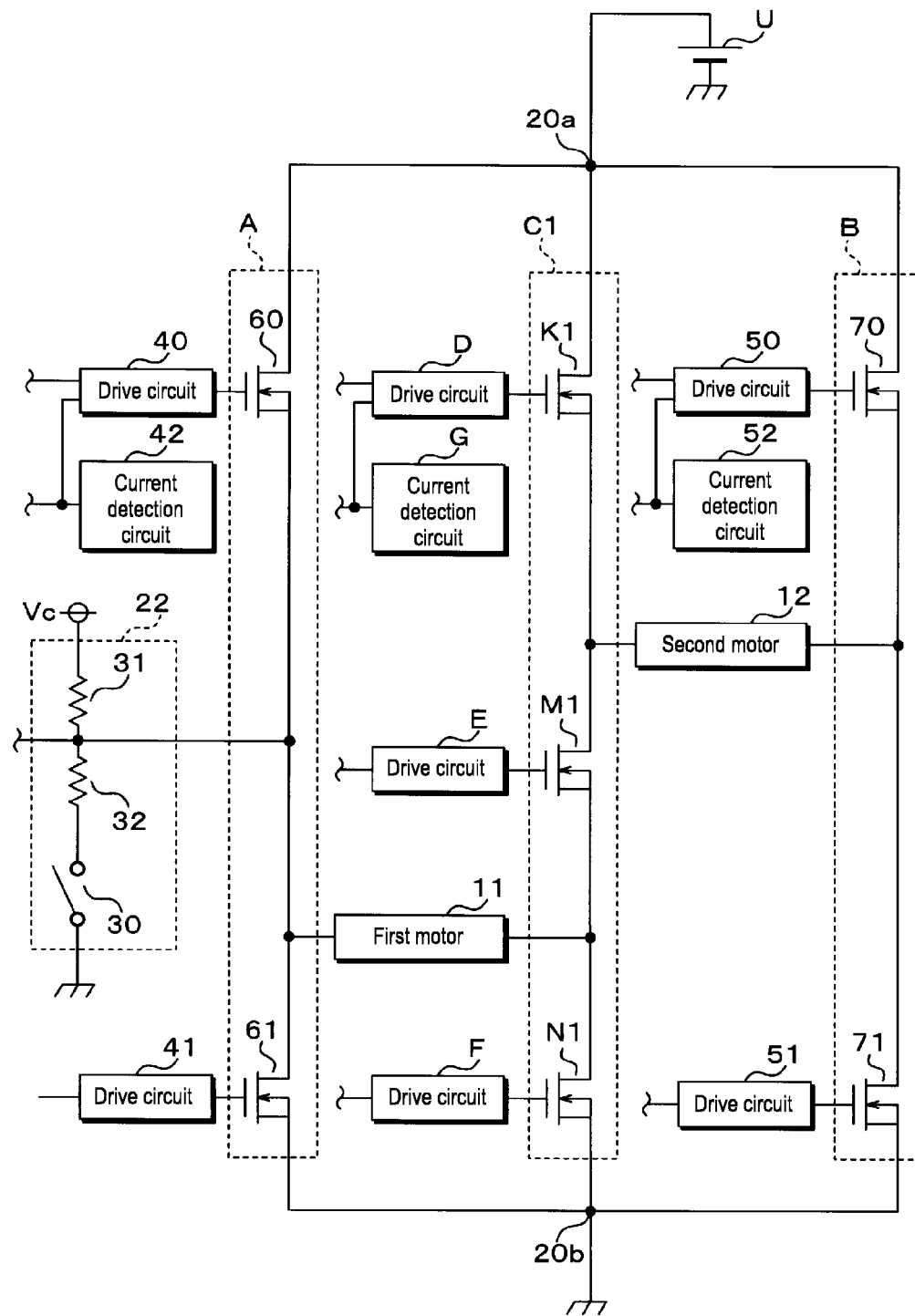
FIG. 15 is a circuit diagram illustrating a series circuit according to a fifth embodiment.

FIG. 15 is a circuit diagram illustrating the series circuit 22 according to the fifth embodiment. As illustrated in FIG. 15, the constant voltage Vc is applied to one end of the first resistor 31. The other end of the first resistor 31 is connected to one end of the second resistor 32. The other end of the second resistor 32 is connected to one end of the circuit switch 30, and the other end of the circuit switch 30 is grounded.

When all the switches of the switch circuit 20 are off, and the circuit switch 30 is on, current flows through the first resistor 31, the second resistor 32, and the circuit switch 30 in that order. The resistor connection node between the first resistor 31 and the second resistor 32 is located on the upstream side of the circuit switch 30.

Note that the circuit switch 30 may be connected between the first resistor 31 and the second resistor 32. In this case, the resistor connection node is the connection node between the circuit switch 30 and the first resistor 31.

Short Circuit Detection Processing

FIG. 16 is a diagram illustrating the short circuit detection processing sequence. The control unit 88 of the microcomputer 21 executes the short circuit detection processing in the same manner as in the first embodiment. In the fifth embodiment, the voltage threshold is greater than a divided voltage obtained by the first resistor 31 and the second resistor 32 dividing the constant voltage Vc, and is no greater than the constant voltage Vc. As described in the first embodiment, the constant voltage Vc is less than the power supply voltage of the DC power supply U.

Comparing the short circuit detection processing according to the fifth embodiment with the short circuit detection processing according to the first embodiment and illustrated in FIG. 6, the timings at which the circuit switch 30 switches on or off are different. The control unit 88 according to the fifth embodiment instructs the switching unit 83 to switch the circuit switch 30 on in Sequences 1, 3, and 5, and instructs the switching unit 83 to switch the circuit switch 30 off in Sequences 2 and 4.

When all the switches of the switch circuit 20 are off and the circuit switch 30 is on, the node voltage is the divided voltage, which is less than the voltage threshold. Here, if both ends of the first input switch 60 are shorted, the node voltage substantially matches the power supply voltage, and is therefore at least the voltage threshold. Accordingly, in Sequence 1, when the node voltage is at least the voltage threshold, the control unit 88 detects a short circuit in the first input switch 60. In Sequences 3 and 5, the control unit 88 detects a short circuit in the same manner as in Sequence 1.

When all the switches of the switch circuit 20 are off and the circuit switch 30 is off, the node voltage is the constant voltage Vc, which is at least the voltage threshold. Here, if both ends of the first input switch 60 or the third output switch Ni are shorted, the node voltage substantially matches zero V, which is less than the voltage threshold. Accordingly, in Sequence 2, when the node voltage is less than the voltage threshold, the control unit 88 detects a short circuit in the first input switch 60 or the third output switch N1. In Sequence 4, the control unit 88 detects a short circuit in the same manner as in Sequence 2.

Effects of Drive Device 10 and Further Notes

The drive device 10 according to the fifth embodiment provides the same effects as those provided by the drive device 10 according to the first embodiment.

In the fifth embodiment, the control unit 88 may execute the third partial drive processing in the same manner as in the second embodiment. The series circuits 22 according to the third and fourth embodiments may be configured in the same manner as the series circuit 22 according to the fifth embodiment. The short circuit detection processing according to the third and fourth embodiments may be executed in the same manner as in the fifth embodiment.

Variations

In the first to fifth embodiments, if the resistance component value of the first motor 11, the second motor 12, or the third motor 13 is not sufficiently smaller than the resistance values of the first resistor 31 and the second resistor 32, the resistor having the smaller resistance value may be connected to the first motor 11, the second motor 12, or the third motor 13 in parallel. This makes it possible for the control unit 88 to appropriately execute the short circuit detection processing.

In the first to fifth embodiments, the method for detecting a short circuit is not limited to a method based on the node voltage, and may be a method based on current, for example. In each sequence of the short circuit detection processing, if current is flowing through a switch which is instructed to be switched off, a failure can be detected in that switch. With this configuration, it is necessary to detect the current flowing through all of the output switches individually. Additionally, the switches of the switch circuit 20 are not limited to N-channel FETs, and may instead be P-channel FETs, bipolar transistors, relay contacts, or the like.

The first to fifth embodiments disclosed here are intended to be in all ways exemplary and in no ways limiting. The scope of the present invention is defined not by the foregoing descriptions but by the scope of the claims, and is intended to include all changes equivalent in meaning to and falling within the scope of the claims.

The invention claimed is:

1. A drive device that drives a first motor and a second motor, the first motor and the second motor rotating in different directions depending on a direction of current flowing therethrough, the drive device comprising:
   a first connection circuit, a second connection circuit, and a third connection circuit, each connected individually between an input end to which current is input and an output end from which current is output,
   wherein in the first connection circuit, two first switches are connected in series,
   in the second connection circuit, two second switches are connected in series,
   in the third connection circuit, three third switches are connected in series,
   the first motor is connected between a first connection node, which is between the two first switches, and a connection node between two of the third switches on the output end side, and
   the second motor is connected between a second connection node, which is between the two second switches, and a connection node between two of the third switches on the input end side.

2. The drive device according to claim 1, further comprising:
   a series circuit in which a first resistor, a second resistor, and a circuit switch are connected in series and a resistor connection node between the first resistor and the second resistor is connected to the first connection node, a constant voltage being applied to the series circuit; and
   a processing unit that executes processing,
   wherein the processing unit executes processing of:
   switching the circuit switch on or off;
   obtaining voltage information indicating a node voltage at the resistor connection node; and
   detecting a short circuit in one of the two first switches, the two second switches, and the three third switches based on the voltage information obtained.

3. The drive device according to claim 2,
wherein the resistor connection node is a connection node on a downstream side of the circuit switch, and
the processing unit executes processing of:
obtaining the voltage information in a case where the two first switches, the two second switches, and the three third switches are instructed to switch off and the circuit switch is on; and
detecting a short circuit in a first switch on the input end side based on the voltage information obtained.

4. The drive device according to any one of claim 2, wherein the resistor connection node is a connection node on a downstream side of the circuit switch, and the processing unit executes processing of:
obtaining the voltage information in a case where the two first switches, the two second switches, and the three third switches are instructed to switch off and the circuit switch is on; and
detecting a short circuit in a first switch on the output end side or a third switch on the output end side based on the voltage information obtained.

5. The drive device according to claim 2, wherein
the resistor connection node is a connection node on a downstream side of the circuit switch, and the processing unit executes processing of:
obtaining the voltage information in a case where the two first switches, the two second switches, a third switch on the input end side, and the third switch on the output end side are instructed to switch off, a third switch connected between the third switch on the input end side and the third switch on the output end side is instructed to switch on, and the circuit switch is off; and
detecting a short circuit in a second switch on the input end side or the third switch on the input end side based on the voltage information obtained.

6. The drive device according to claim 2, wherein the resistor connection node is a connection node on a downstream side of the circuit switch, and
the processing unit executes processing of:
obtaining the voltage information in a case where the two first switches, the two second switches, the third switch on the input end side, and the third switch on the output end side are instructed to switch off, a third switch connected between the third switch on the input end side and the third switch on the output end side are instructed to switch on, and the circuit switch is on; and
detecting a short circuit in a second switch on the output end side based on the voltage information obtained.

7. The drive device according to claim 2, wherein the resistor connection node is a connection node on a downstream side of the circuit switch, and
the processing unit executes processing of:
obtaining the voltage information in a case where one or both of the second switch on the input end side and the third switch on the input end side are instructed to switch on, remaining switches among the two first switches, the two second switches, and the three third switches are instructed to switch off, and the circuit switch is off; and
detecting a short circuit in a third switch connected between the third switch on the input end side and the third switch on the output end side based on the voltage information obtained.

8. The drive device according to claim 2, wherein when a short circuit is detected in the first switch on the output end side or the third switch on the output end side, the processing unit executes processing for driving only the second motor by instructing the two second switches and the three third switches to switch on or off individually.

9. The drive device according to claim 2, wherein when a short circuit is detected in one of the two second switches and the third switch on the input end side, the processing unit executes processing for driving only the first motor by instructing the two first switches and the three third switches to switch on or off individually.

10. The drive device according to claim 2, wherein the processing unit executes processing of:
determining whether to drive the first motor when a short circuit is detected in the third switch connected between the third switch on the input end side and the third switch on the output end side; and
driving the second motor when it is determined that the first motor is not to be driven.

11. The drive device according to claim 2, wherein the processing unit executes processing of:
determining whether to drive the second motor when a short circuit is detected in the third switch connected between the third switch on the input end side and the third switch on the output end side; and
driving the first motor when it is determined that the second motor is not to be driven.

12. The drive device according to claim 1, wherein there are at least two of the third connection circuits,
the first motor is connected between a connection node between the two first switches, and an output-side connection node, which is between two of the third switches on the output end side of one of the third connection circuits,
the second motor is connected between the connection node between the two second switches, and an input-side connection node, which is between two of the third switches on the input end side of a third connection circuit, among the third connection circuits, that is different from the third connection circuit to which the first motor is connected,
a third motor is connected between the input-side connection node of one of two of the third connection circuits and the output-side connection node of the other of the two third connection circuits, the third motor rotating in different directions depending on a direction of current flowing therethrough, and
one motor is connected to each of the input-side connection node and the output-side connection node of each of the third connection circuits.

13. A short circuit detection method of a computer executing:
a step of switching a circuit switch of a drive device on or off, the drive device including two first switches, two second switches, three third switches, and a series circuit in which a first resistor, a second resistor, and the circuit switch are connected in series and a constant voltage is applied to the series circuit, and the drive device driving a first motor and a second motor, the first motor and the second motor rotating in different directions depending on a direction of current flowing therethrough;
a step of obtaining voltage information indicating a node voltage of a resistor connection node between the first resistor and the second resistor; and
a step of detecting a short circuit in one of the two first switches, the two second switches, and the three third switches based on the voltage information obtained, wherein the drive device further includes a first connection circuit, a second connection circuit, and a third connection circuit individually connected between an input end to which current is input and an output end from which current is output, in the first connection circuit, the two first switches are connected in series, in the second connection circuit, the two second switches are connected in series, in the third connection circuit, the three third switches are connected in series, the first motor is connected between a first connection node, which is between the two first switches, and a connection node between two of the third switches on the output end side, the second motor is connected between a second connection node, which is between the two second switches, and a connection node between two of the third switches on the input end side, and the resistor connection node is connected to the first connection node.

14. A computer program used to cause a computer to execute:

a step of switching a circuit switch of a drive device on or off, the drive device including two first switches, two second switches, three third switches, and a series circuit in which a first resistor, a second resistor, and the circuit switch are connected in series and a constant voltage is applied to the series circuit, and the drive device driving a first motor and a second motor, the first motor and the second motor rotating in different directions depending on a direction of current flowing therethrough;

a step of obtaining voltage information indicating a node voltage of a resistor connection node between the first resistor and the second resistor; and a step of detecting a short circuit in one of the two first switches, the two second switches, and the three third switches based on the voltage information obtained, wherein the drive device further includes a first connection circuit, a second connection circuit, and a third connection circuit individually connected between an input end to which current is input and an output end from which current is output, in the first connection circuit, the two first switches are connected in series, in the second connection circuit, the two second switches are connected in series, in the third connection circuit, the three third switches are connected in series, the first motor is connected between a first connection node, which is between the two first switches, and a connection node between two of the third switches on the output end side, the second motor is connected between a second connection node, which is between the two second switches, and a connection node between two of the third switches on the input end side, and the resistor connection node is connected to the first connection node.

* * * * *